US008675678B2

(12) United States Patent
Farrag et al.

(10) Patent No.: US 8,675,678 B2
(45) Date of Patent: Mar. 18, 2014

(54) ADAPTIVE MEDIUM ACCESS CONTROL

(75) Inventors: Osama I. Farrag, Germantown, MD (US); William P. D'Amico, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 346 days.

(21) Appl. No.: 13/230,234

(22) Filed: Sep. 12, 2011

(65) Prior Publication Data
US 2012/0182867 A1   Jul. 19, 2012

Related U.S. Application Data

(60) Provisional application No. 61/381,460, filed on Sep. 10, 2010.

(51) Int. Cl.
*H04J 3/16* (2006.01)
(52) U.S. Cl.
CPC ........................... *H04J 3/16* (2013.01)
USPC ........... 370/447; 370/229; 370/235; 370/252; 370/310; 370/348; 370/445; 370/468
(58) Field of Classification Search
None
See application file for complete search history.

(56) References Cited

U.S. PATENT DOCUMENTS

| | | | |
|---|---|---|---|
| 6,678,252 B1 * | 1/2004 | Cansever | 370/253 |
| 7,187,691 B2 | 3/2007 | Gavette | |
| 7,542,478 B1 * | 6/2009 | Ozer et al. | 370/447 |
| 7,570,593 B1 | 8/2009 | ElBatt et al. | |
| 7,590,589 B2 | 9/2009 | Hoffberg | |
| 7,639,663 B1 | 12/2009 | Nerses et al. | |
| 7,643,509 B2 | 1/2010 | Han et al. | |
| 7,664,132 B2 | 2/2010 | Benveniste | |
| 7,710,870 B2 | 5/2010 | Lee et al. | |
| 7,768,992 B2 | 8/2010 | Pun | |
| 7,881,340 B2 * | 2/2011 | Farrag et al. | 370/468 |
| 7,902,973 B2 * | 3/2011 | Thubert et al. | 340/506 |
| 8,068,428 B2 * | 11/2011 | Strutt et al. | 370/238 |
| 8,115,617 B2 * | 2/2012 | Thubert et al. | 340/506 |
| 8,280,308 B2 * | 10/2012 | Anschutz et al. | 455/41.2 |
| 8,289,186 B2 * | 10/2012 | Osafune | 340/903 |
| 2004/0121786 A1 * | 6/2004 | Radcliffe et al. | 455/500 |
| 2008/0009288 A1 | 1/2008 | Orfanos et al. | |
| 2010/0142445 A1 | 6/2010 | Schlicht et al. | |
| 2011/0009062 A1 * | 1/2011 | Anschutz et al. | 455/41.2 |

OTHER PUBLICATIONS

Kaixin Xu, Sang Bae, Sungwook Lee, Mario Gerla, TCP Behavior across Multihop Wireless Networks and the Wired Internet, Computer Science Dept., UCLA, (2002) pp. 1-8.
Myung-Sup Kim, Young J. Won, James W. Hong, Characteristic analysis of internet traffic from the perspective of flows, Computer Communications, 29 (2005) 1639-1652.

* cited by examiner

*Primary Examiner* — Jay P Patel
(74) *Attorney, Agent, or Firm* — Noah J. Hayward

(57) ABSTRACT

Bandwidth allocation configuration and fully decentralized adaptive medium access control (AMAC) systems and methods with support for time critical applications, spectrum efficiency, scalability enhancements, and fair allocation of bandwidth among nodes sharing a common channel. The methods fully integrate TDMA and CSMA/CA channel access approaches and incorporate adaptive congestion and collisions avoidance scheme to reduce bandwidth wastage and diminish adverse cross layers interactions. AMAC improves support for multi-media traffic while allowing higher transmission incidents from large number of transmitting devices sharing a common channel, with fair distribution of the available bandwidth, to enable improved multi-level-security connectivity over a common multi-hop wireless network, provide end-to-end performance enhancement for constant bit rate traffic, variable bit rate traffic, and distribute bandwidth fairly amongst competing TCP traffic flows that traverse varying length paths in multi-hop ad-hoc wireless networks.

23 Claims, 24 Drawing Sheets

$$\text{Max\_Deferral\_plus\_Back-off\_Time} = \tau_{MDB\text{-}time} \quad \text{(EQ. 1)}$$

$$\tau_{MDB\text{-}time} = Physical\_Layer\_CSMA\_CA\_Deferral\_Period + 255\Delta T \quad \text{(EQ. 2)}$$

$$\text{Time to switch between Transmit and Receive mode} = \text{Short Inter-Frame Space} = SIFS \quad \text{(EQ. 3)}$$

$$CPD_i = \text{Duration of the } i^{th} \text{ Contention Period within an Epoch} \quad \text{(EQ. 4)}$$

$$\text{Minimum\_CP\_Duration} = Min\_ACPD \quad \text{(EQ. 5)}$$

$$Min\text{-}ACPD = \tau_{MDB\_time} + RTS_{TX\_Time} + SIFS + CTS_{TX\_Time} + SIFS + MaxDataPkt_{TX\_Time} + SIFS + ACK_{TX\_Time} \quad \text{(EQ. 6)}$$

Provision new CFP if:
$$\{\forall CPi,\ CPDi \geq Min\_ACPD\} \quad \text{(EQ. 7)}$$

FIG. 6

ADAPTIVE MEDIUM ACCESS CONTROL

CROSS REFERENCE TO RELATED APPLICATIONS

This application claims the benefit of U.S. Provisional Patent Application No. 61/381,460, titled, "Multimedia Enabled Adaptive-Medium-Access-Control (AMAC) Method for Wireless Networks," filed Sep. 10, 2010, which is incorporated herein by reference in its entirety.

STATEMENT OF GOVERNMENTAL INTEREST

This invention was made support from the U.S. Naval Air Systems Command under contract number N68936-09-C-001. The U.S. Government has certain rights in the invention.

BACKGROUND

1. Technical Field

Methods and systems are disclosed herein with respect to adaptive medium access control (AMAC) and, more particularly, AMAC in wireless ad hoc networks, including wireless mobile ad-hoc networks.

2. Related Art

A wireless ad hoc network is a decentralized type of wireless network that does not rely on a preexisting infrastructure, such as routers in wired networks or access points in managed-infrastructure wireless networks. Instead, each node participates in routing by forwarding data for other nodes. A determination as to which nodes forward data is made dynamically based on network connectivity. The decentralized nature of wireless ad hoc networks makes them suitable for a variety of applications where central nodes cannot be relied on.

Wireless ad hoc networks may be classified by their application, such as mobile ad hoc networks (MANET), wireless mesh networks (WMN), and wireless sensor networks (WSN)

Wireless links between nodes may be influenced by node resources, such as transmit power, computing power, and memory. Wireless links may also be influenced by factors such as reliability, link distance, signal loss, interference, and noise.

Since links can be connected or disconnected at any time, an ad-hoc network must be able to provide dynamic restructuring that is timely, efficient, reliable, robust and scalable. In a MANET, where nodes are mobile, dynamic restructuring can be even more challenging.

Due to the extensive variety of possible situations that may occur in wireless ad hoc networks, modeling and simulation may be employed with extensive parameter sweeping and what-if analyses, which may be performed with modeling and simulation tools, such as an open source Network Simulator II (NS2).

In an ad-hoc network, contention amongst nodes for access to a shared wireless medium often results collisions and channel congestion.

Conventional computing/communication networks manage network resources and network access from a dedicated or central control node, and with protocols and infrastructure that are not readily amenable to wireless ad-hoc networks, and particularly not amendable to wireless mobile ad-hoc networks (MANETs).

Conventional wireless local area networks (WLANs) use carrier sense multiple access/collision avoidance (CSMA/CA) technology, such as specified in IEEE standard 802.11.

The collision avoidance mechanism employed by CSMA/CA utilizes a random back-off period prior to each transmission. The random nature of the back-off period reduces but does not eliminate the probability of collisions. In order to detect and recover from collisions, an acknowledgment mechanism must be used with each transmitted message. When an acknowledgment is not received, a message may be re-transmitted. With each re-transmit attempt, the back-off period is randomly selected from an expanded contention time window using a binary exponential back-off scheme.

Many published studies have shown that these random back-off and collision recovery schemes significantly compromise the performance of CSMA/CAWLANs in terms of access delay, delay jitter, and network throughput, particularly as the number of stations and offered load increases.

There is a need to for more flexible and adaptive techniques to avoid collisions and congestion.

SUMMARY

Disclosed herein are adaptive medium access control (AMAC) methods and systems, which may be implemented in a decentralized fashion, in a wireless ad-hoc network, including a wireless mobile ad-hoc network (MANET).

AMAC may include synchronizing periodic epochs of time and a state of a schedule with other nodes of the network. The schedule may include alternating contention periods and contention free periods within the epochs. The contention free periods may allocated amongst the nodes.

AMAC may permit a node to initiate a transmission during a contention free period allocated to the node, and extend and complete the transmission during an immediately-subsequent contention period.

The contention free periods may include a relatively short contention free period equal to a sum of a deferral period and a time to exchange request-to-send and clear-to-send control frames, in which case, and an allocated node may be permitted to retain use of the channel into a subsequent contention period to transmit a data packet and receive an acknowledgment. A node may reserve one of the short-duration contention free periods in each of multiple successive epochs to support a variable bit rate application of the node. A node may reserve multiple ones of the short-duration contention free periods in each of multiple successive epochs to support a constant bit rate application of the node. A short contention free period may be useful to guarantee access to a node, with limited risk of unused bandwidth in the event that the allocated node does not have data ready to transmit at the time of an allotted contention free period.

AMAC may include adaptive collision protection for broadcast packets based on channel congestion. The node may maintain a running measure of congestion during each epoch, which may include measuring busy times of contention periods, aggregating the measured busy times over durations of corresponding epochs, and computing an aggregate channel congestion factor over the duration of the corresponding epochs as a function of an elapsed time of the epoch and a corresponding aggregate of the measured busy times of contention periods within the epoch. The node may preclude broadcasting of a packet from the node during a contention period when the channel congestion factor is above a configurable congestion factor threshold, which may be configurable.

AMAC may include adaptive collision protection for unicast packets, where a node maintains a count of a number of times a unicast packet is re-transmitted from the node, and precludes re-transmission of the unicast packet from the node during contention periods when the count reaches a first count threshold. The node may further preclude re-transmission of the unicast packet from the node during contention free periods allocated to the node when the count reaches a second count threshold.

These and other features are described herein.

BRIEF DESCRIPTION OF THE DRAWINGS/FIGURES

FIG. 6 is a table of equations, EQ. 1 through EQ. 7, associated with the example minimum duration of a CP of FIG. 5.

Figure 1:
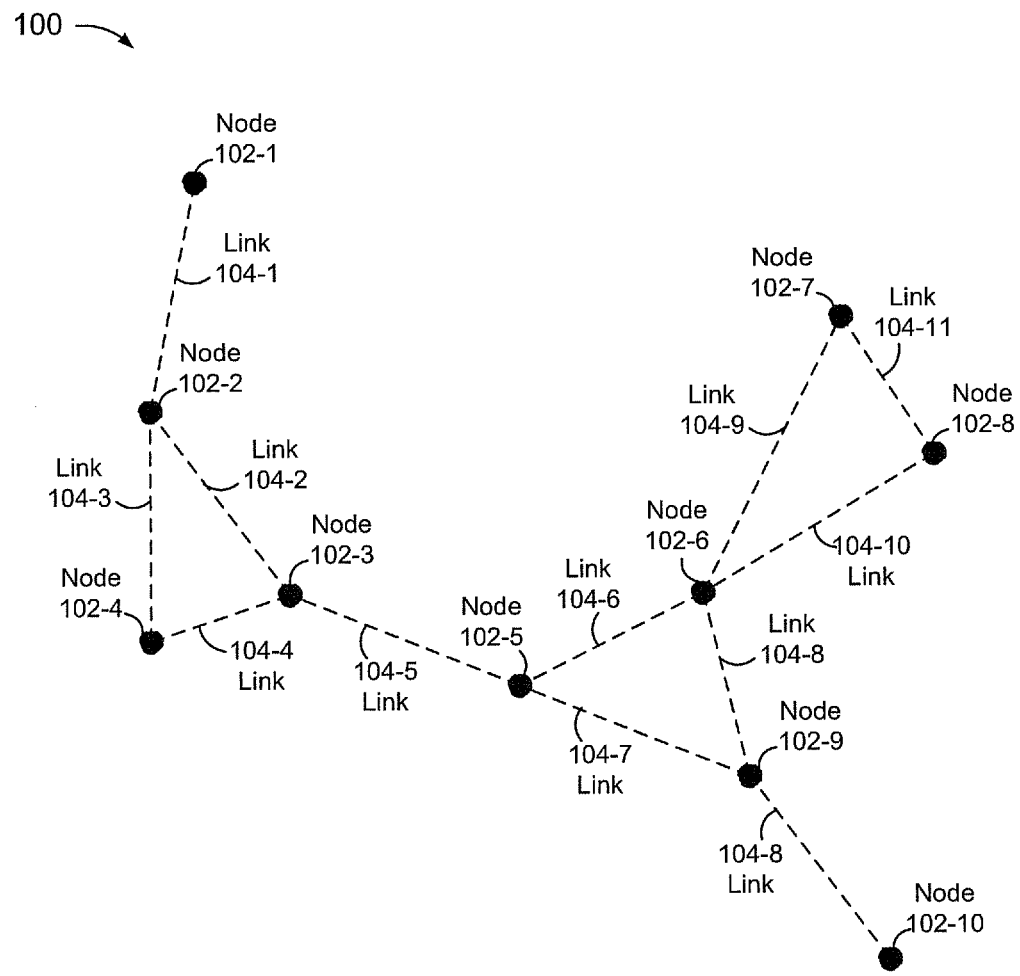
FIG. 1 is an illustration of a network, including multiple nodes and communication links amongst the nodes, which may represent a wireless ad hoc network, such as a mobile ad hoc wireless network (MANET).

In the drawings, the leftmost digit(s) of a reference number identifies the drawing in which the reference number first appears.

DETAILED DESCRIPTION

1. Introduction

Wireless communication is a critical enabling technology for many applications in commercial, scientific, government, and military environments. Design choices made at the lower layers of the OSI communication stack may have major implications on the overall performance of applications when communicating over shared wireless channels, particularly in multi-hop wireless networks. More specifically, Medium Access Control (MAC) designs should avoid adverse cross layer-interactions.

A good general purpose wireless MAC design suitable for broad range of applications must consider several issues and achieve a good balance among several conflicting requirements. Such wireless MAC design should offer robust adaptive techniques to allow efficient utilization of channel capacity while maintaining fair distribution of bandwidth among competing nodes during heavy and low traffic load conditions; this MAC must support adaptive congestion avoidance and recovery methods without causing adverse cross-layer interactions with upper-layer protocols. The wireless MAC design must scale to allow large number of nodes and high incidents of packets transmissions from competing traffic flows to co-exist and fairly share the available channel capacity; and this MAC design should provide efficient support for time-critical traffic and deterministic bandwidth guarantees for bandwidth-sensitive constant bit rate traffic as well as asynchronous variable rate traffic.

The most common wireless MAC designs in deployment are the Frequency Division Multiple Access (FDMA), Time Division Multiple Access (TDMA), and Carrier Sense Multiple Access/Collision Avoidance (CSMA/CA). Unfortunately, these MAC techniques do not provide sufficiently fine grained adaptability to adjust to varying traffic loads. These MAC techniques also provide limited scalability and suffer from a variety of adverse cross-layer interactions, which may limit their suitability for applications in multi-hop wireless network environments.

MAC designs that employ a pure TDM access method partition the bandwidth of a shared channel into fixed intervals, where each interval can be dedicated for use by one node to transmit data to any node within its transmission range. TDM utilizes a common periodic time reference that occurs at fixed intervals of a TDM superframe. Each periodic superframe is partitioned into finite periods of equal size, or timeslots. Each timeslot occurs once every superframe. Any node using a TDM system can be assigned dedicated timeslots to transmit data to any destination within its radio transmission range. TDM MAC design offers excellent support for applications with strict requirements for minimum bandwidth and/or maximum access delay from the communication system. Specifically, where a node is assigned a recurring time slot, the node will not have to wait more than the duration of one superframe to send data.

Similarly, MAC systems that use FDMA techniques allocate a specific RF channel, a dedicated portion of the spectrum, for use by a single node; or assign a dedicated portion of the spectrum, RF channel, for a pair of nodes to exchange traffic in Time Division Duplex (TDD) mode. FDM systems provide the lowest access delay guarantees and allow deterministic bandwidth allocations. However, since RF spectrum is a finite and very scarce resource, FDM MAC systems are not viable solution for large scale networks; because in order to be able to fully interconnect "n" nodes in full mesh single hop ad-hoc fashion, the FDM system needs O(n!) dedicated channels. Moreover, in multi-hop Mobile Ad-hoc Networks (MANET), FDM systems require very complex coordination scheme between all nodes to allow any pair of transmit and receive nodes to synchronously switch their transmitter and receiver circuits to the appropriate dedicated channel; this is a very complex process that will introduce significant bandwidth overhead.

In contrast, standard CSMA/CA MAC systems use a simple stochastic access control mechanism and rely on collision avoidance and recovery methods to allow large number of nodes to share a common channel. CSMA/CA MAC systems will scale to allow large number of nodes to internetwork using a single channel, if the aggregate traffic load on the channel is significantly lower than the total capacity, or bandwidth of the shared channel. However, standard CSMA/CA systems will experience heavy incidents of collisions and poor bandwidth distribution as the traffic load increases as nodes simultaneously compete for the shared channel. Moreover, CSMA/CA systems suffer from hidden node collisions and exposed node induced congestion issues when utilized in multi-hop wireless networks.

Many civilian and military applications depend on untethered connectivity to be able to internetwork while on the move using wireless links. The operations and services of these applications rely on TCP/IP family of protocols to leverage existing web services that increasingly expect higher quality of service guarantees, scalability, and fair distribution of bandwidth. For example, in order to economically provide broadband internet connectivity to citizens living in rural areas, we must rely on multi-hop wireless networks. In addition, in recent years, there are increased deployments of TCP/IP broadband mobile access services using multi-hop mesh networks across several U.S. metropolitan areas supported by various commercial ventures and local municipalities. In military application, the advent of groups of unmanned air and ground vehicles and unattended sensors to support tactical missions will require robust multi-hop wireless networks; and DoD test ranges must provide enhanced wireless networking capability to support high data rate, telemetry-like, traffic from a large number of test articles. Additionally, the test data and applications may require a Multi-Level Security (MLS) capability at systems under tests, the test control system, and the wireless network used to collect test data which often results in higher transmission incidents and increased contentions.

It is clear that there is an acute need for technologies that enable efficient use of the spectrum, increase scalability to large number of mobile nodes and traffic flows, as well as support for responsive and adaptive fair allocation of bandwidth among the connected mobile devices. Our proposed AMAC system and methods will support multi-hop wireless networks and are suitable for use in infrastructure based as well as infrastructure-less mobile ad-hoc networks without causing adverse cross-layer interactions within the multi-layer TCP/IP protocol stack.

2. Adaptive Medium Access Control (AMAC) Protocol

FIG. 1 is an illustration of a network 100, including multiple nodes 102 that communicate amongst links 104. Network 100 may represent an ad hoc network, such as a wireless ad hoc network, and may represent a mobile ad hoc wireless network (MANET).

Each node may include a medium access controller (MAC), to provide adaptive medium access control (AMAC), as disclosed herein.

AMAC may include distributed adaptive control algorithms and bandwidth partitioning methods that collectively provide support for fully integrated contention and contention free medium access control, which may be implemented to provide and/or support deterministic bandwidth and access delay guarantees for nodes that compete in sharing of resources of a wireless channel. AMAC may be applied to a wireless access system that supports a common time reference and synchronized schedule amongst multiple nodes, where the schedule allocates channel bandwidth amongst competing nodes for defined periodic durations, or periods of time.

A prototype AMAC system as taught herein, has been implemented as an extension of decentralized media access control (DMAC) techniques taught in U.S. Pat. No. 7,881, 340, titled, "Decentralized Media Access Control for Ad-hoc Mobile Wireless Network," which is incorporated herein by reference in its entirety, including with respect to establishing a common time reference based on a repeating scheduled beacon transmit time (SBTT), contention periods and contention free periods, time-scheduling of contention and contention-free periods, and granting access to the contention periods. Performance of the AMAC system is described further below.

As disclosed herein, AMAC may include one or more of:
periodic epochs synchronized amongst multiple nodes;
alternating contention free periods (CFPs) and contention periods (CPs) in a periodic schedule;
adaptive and guaranteed access to media using relatively short CFPs;
adaptive collision avoidance for broadcast packets; and
adaptive collision avoidance for unicast packets.

2.1. Synchronized Periodic Epoch

Figure 2:
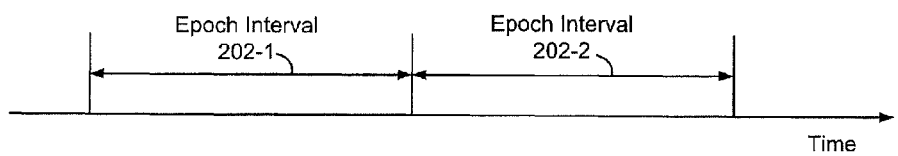
FIG. 2 is a timing diagram including periodic time intervals, referred to herein as epochs.

FIG. 2 is a timing diagram 200 including periodic time references, intervals, or period, referred to herein as epochs, 202.

Periodic epochs may be established and/or synchronized amongst nodes that share a communication channel in a multi-hop ad-hoc network. Periodic epochs may be synchronized amongst all nodes that are to collaborate in sharing the resources of the shared channel.

In the prototype AMAC system discussed above, DMAC techniques are used to establish scheduled beacon transmit time (SBTT) periodic frames in a fully decentralized manner. AMAC is not, however, limited to DMAC techniques to establish and/or synchronize epochs. AMAC may be implemented, for example, with one or more other decentralized and/or centralized techniques to establish and synchronize periodic epochs, such as GPS global timing and/or other centralized timing schemes.

2.2. Periodic Schedule of Alternating Contention Free Periods (CFPS) and Contention Periods (CPs)

Periodic epochs 202 may include alternating contention periods (CPs) and contention free periods (CFPs), such as described below with reference to FIG. 3.

Figure 3:
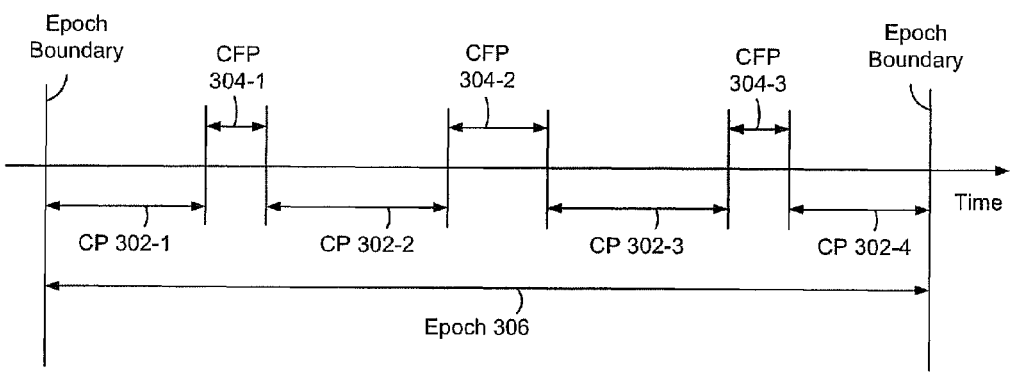
FIG. 3 is a timing diagraph alternating contention periods (CPs) and contention free periods (CFPs) within an epoch.

FIG. 3 is a timing diagraph 300, including alternating CPs 302 and CFPs 304 within an epoch 306.

Nodes 102 may include distributed and adaptive control methods and algorithms to collaborate with one another to maintain synchronization of a common state of a contention free periods schedule (CFPS), such as taught in U.S. Pat. No. 7,881,340. Synchronization of a common state of a CFPS is not, however, limited to the example of U.S. Pat. No. 7,881,340.

A CFPS may identify all CFPs that occur within an epoch, and may include information for each CFP. CFP information may include, for each CFP, identification of a node that is allocated exclusive use of the channel during the CFP, a start time of the CFP, and a duration of the CFP. A node to which a CFP is allocated may be referred to herein as an allocated node and/or a local node.

2.3. Retaining Channel During a Subsequent Contention Period

AMAC may be implemented to permit an allocated node to initiate a transmission during a reserved CFP and complete the transmission during an immediately-subsequent CP, such as described below with reference to FIG. 4.

Figure 4:
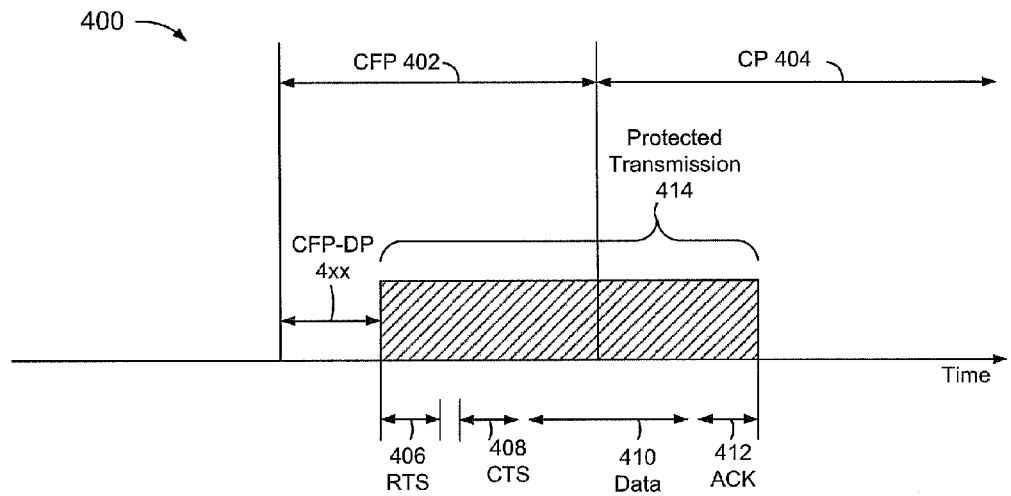
FIG. 4 is a timing diagram of a CFP and an immediately-subsequent CP, in which an allocated node initiates a data transmission during the CFP and completes the transmission in the CP.

FIG. 4 is a timing diagram 400, including a CFP 402 and an immediately-subsequent CP 404. In the example of FIG. 4, an allocated node sends a request-to-send (RTS) 406 to another node, and receives a clear-to-send (CTS) 408 from the other node, collectively referred to herein exchange as an RTS/CTS exchange.

The allocated node also initiates transmission of data 410 to the other node during CFP 402. The allocated node may complete the transmission of data 410 during CFP 402 or during CP 404. In the example of FIG. 4, the allocated node completes the transmission of data 410, and receives an acknowledgment, ACK 412, during CP 404.

AMAC may be implemented to preclude other nodes from contending for access to the channel prior to ACK 412, such as described further below. Transmission by the allocated node may thus be referred to herein as a protected transmission 414.

Where the allotted node does not need does not utilize the channel beyond the end of CFP 402, other nodes may contend for the channel during CP 404, such as with one or more conventional Carrier Sense Multiple Access/Collision Avoidance (CSMA/CA) techniques.

2.4. Contention Period Duration

AMAC may be implemented to insure that, when scheduling CFP 402, CP 404 is of sufficient duration to permit a node to transmit during CP 404. This may be useful, for example, to insure that another node has sufficient time to evaluate channel congestion and transmit data over the channel in the event that the allocated node of CFP 402 does not use CP 404. AMAC may be implemented to insure that CP 404 is of sufficient duration to permit the other node to transmit a maximum-size data packet over the channel.

Figure 5:
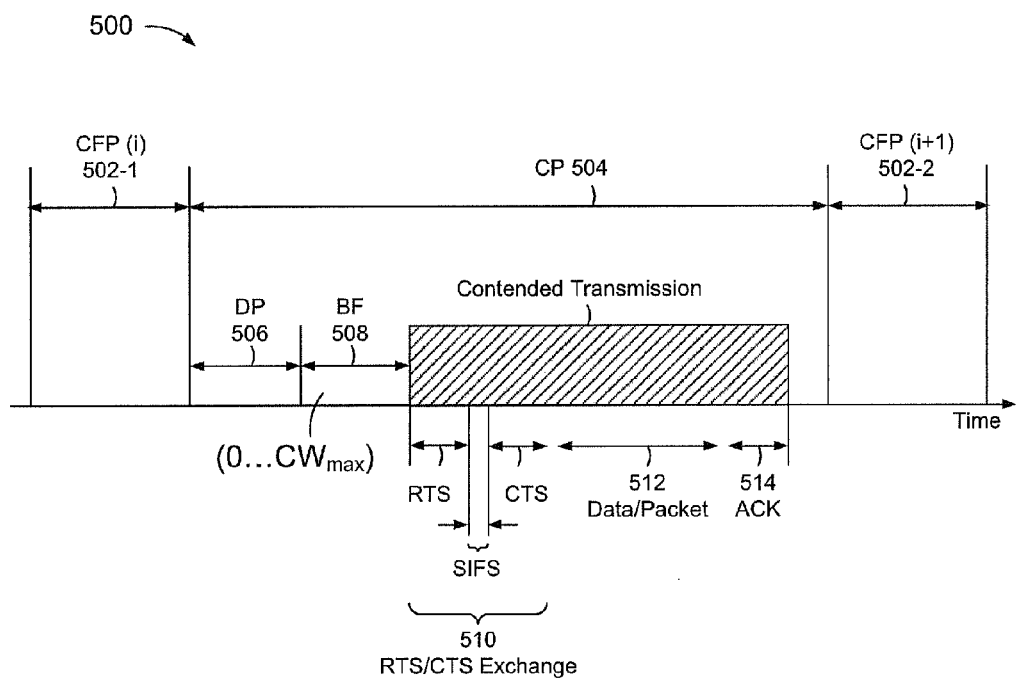
FIG. 5 is a timing diagram to illustrate an example minimum duration of a CP.

FIG. 5 is a timing diagram 500, including successive CFPs (i) and (i+1), illustrated here as CFPs 502-1 and 502-2, respectively, and an intervening CP 504, within an epoch.

AMAC may be implemented to preclude acceptance or insertion of CFP 502-2 within the epoch unless a resultant, or minimum duration of CP 504 is sufficient to transmit at least one data packet.

AMAC may be implemented to insure that a minimum duration of CP 504 is sufficient to transmit at least one data packet having a of maximum allowed packet size of an underlying physical layer.

As illustrated in EQS. 1-7 of FIG. 6, AMAC may be implemented to insure that minimum duration of CP 504 is at least equal to a sum of:

a maximum possible deferral period 506;
a maximum random access back-off period 508;
a minimum time 510 to exchange RTS/CTS control frames 510, including a time to switch between transmit and receive modes, illustrated in FIG. 5 as a short inter-frame space (SIFS);
a minimum time to transmit maximum allowed packet size 512; and
a time to receive an ACK control frame 514.

The example of FIG. 5 may be based on conventional CSMA/CA access techniques. Methods and systems disclosed herein are not, however, limited to conventional CSMA/CA access techniques.

The prototype AMAC system described above expands upon DMAC techniques to support alternating CFPs and CPs, with algorithms to verify, prior to accepting a new CFP into a CFPS, that the time between the start of the new CFP and the end of a preceding CFP, within a periodic DMAC SBTT frame, is sufficient to provide a CP with sufficient duration to permit transmission of at least one maximum size packet for the underlying physical layer using a conventional CSMA/CA access scheme with RTS/CTS exchange.

2.5. Short-Duration Contention Free Periods, Guaranteed Access, and Fine Grain Adaptive Spectrum Efficiency Many civilian and military applications require strict Quality of Service (QoS) guarantees from the network service to support application traffic with strict maximum time delay and/or minimum throughput constraints. These constraints may be important in a variety of applications, such as Voice-Over-IP (VOIP), streaming video, other multimedia commercial applications, telemetry networks applications military test ranges, and tactical-edge wireless network applications. Often due to the QoS guarantees requirements, wireless networks designer have adapted dedicated point-to-point frequency division multiplexing (FDM) and time division multiplexing (TDM) link layer technologies.

Such link layer technologies may, however, be inefficient with respect to spectrum utilization. Specifically, with link layer technologies, generated traffic rate is asynchronous with time varying characteristics in terms of average data rate, size of traffic burst, size of packets. As a result, it may not be feasible to accurately estimate the amount of bandwidth to be statically assigned to each communicating device. Instead, the highest possible data rate may need to be reserved for each node, which may lead to underutilized bandwidth. Alternatively, modifications may be made to support allocation of traffic on-demand on a packet-per-packet basis, or burst-per-burst basis, which may introduce unacceptable delays and/or significant increases in control traffic overhead, which may negate any potential spectrum efficiency gains from releasing and reserving bandwidth on-demand.

With a conventional TDM or FDM link layer technology, allocation of dedicated bandwidth may include reserving the maximum potential rate that the node may produce at any point in time. The reserved channel capacity may, however, be underutilized if the node does not have sufficient data to fill the reserved capacity. In practice, a dedicated channel of an FDM network may be left idle and/or fill patterns may be transmitted much of the time. Similarly, in a TDM based wireless link, many timeslots may not be fully utilized because a device that owns the dedicated timeslot may not have data to send when the timeslot starts, or may have a short data packet that does not fill the total bandwidth available for transmission during the timeslot period.

Figure 7:
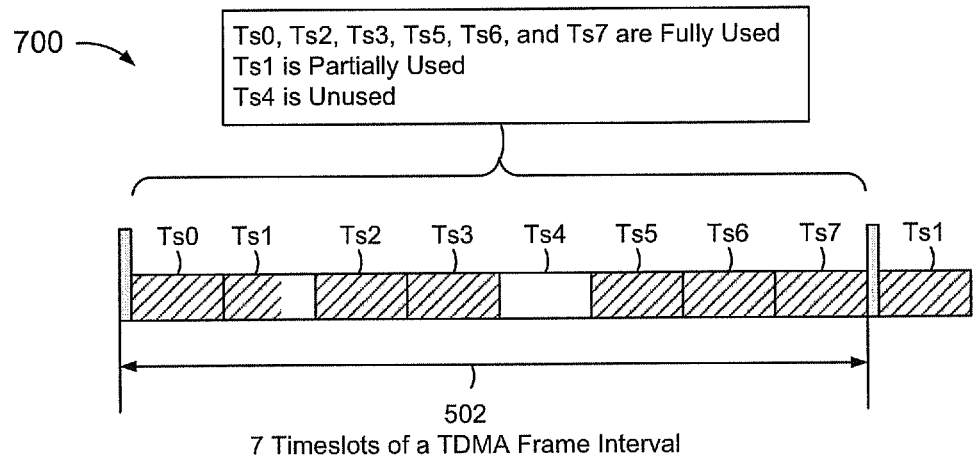
FIG. 7 is a timing diagram of a TDMA frame interval to illustrate bandwidth inefficiencies of a conventional TDM protocol.

FIG. 7 is a timing diagram 700, including a TDMA frame interval 702, having timeslots Ts0 through Ts7. In the example of FIG. 7, timeslots Ts0, Ts2, Ts3, Ts5, Ts6, and Ts7 are fully used, timeslot Ts1 is partially used, and timeslot Ts4 is unused.

As described in examples above, AMAC may be implemented to permit a packet transmission to start in a CFP and continue through a subsequent CP, and to permit other nodes to contend for the subsequent CP when the allotted node does not utilize the CP. In other words, an allotted node may utilize up to the total duration of a reserved CFP and a subsequent CP, when needed, yet other nodes may contend for the subsequent CP when the allotted node does not utilize the CP. This may permit more efficient use of channel bandwidth, particularly with respect to CPs.

AMAC may be implemented to support TDMA and CSMA/CA access.

In the example of FIG. 4, CFP 402 provides at least enough time, or bandwidth, to permit an allotted node to perform an RTS/CTS exchange, and to at least initiate data transmission. CFP are not, however, limited to the example of FIG. 4.

For example, a CFP may be limited to a time that is sufficient to permit an allotted node to perform an RTS/CTS exchange. In such a situation, the allotted node may initiate and complete data transmission during a subsequent CP.

Relatively short CFPs may be used to effectively guarantee channel access to a node during an epoch, while limiting potential idle time of the channel in the event that the node does not have data ready for transmission at the allotted time.

A shorter CFP may reduce the minimum amount of time allotted to a node, without reducing the permissible amount of time for which the node may use the channel to transmit a packet. A shorter duration CFP may limit channel idle time in the event that the allotted node does not have data ready to transmit at the time of the CFP, and may be useful, for example, with respect to an application having an unpredictable and/or variable bit rate (VBR).

A longer CFP may, however, be useful with respect to an application having a predictable channel bandwidth, such as a constant bit rate (CBR) application.

AMAC may be implemented to permit reservation of a CFP having one of multiple selectable fixed durations.

Alternatively, or additionally, AMAC may be implemented to permit reservation of a CFP a duration that is variable within a range.

Alternatively, or additionally, AMAC may be implemented to permit reservation selectable numbers of a fixed and relatively short CFP, within a given epoch. For example, a single CFP may be reserved for a VBR application, whereas one or more CFPs may be reserved for a CBR application, depending upon the predicted bit rate. Permitting reservation of a selectable number of CFPs within an epoch effectively permits reservation of a variable-duration CFP.

Figure 8:
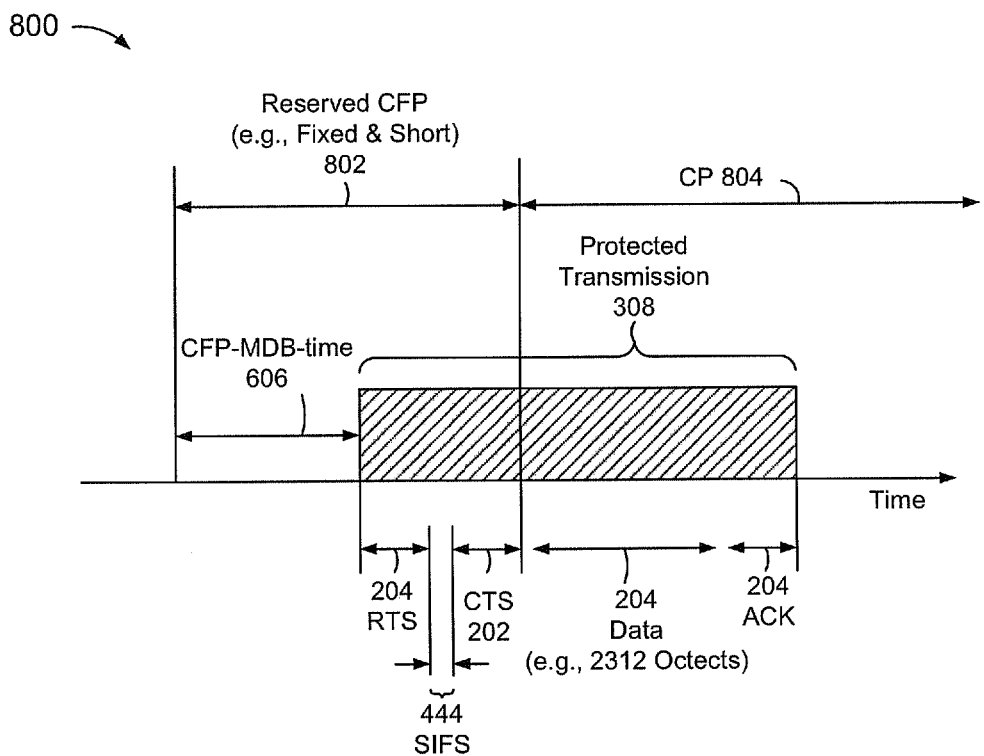
FIG. 8 is a timing diagram of a relatively short CFP, and an immediately-subsequent CP.

FIG. 8 is a timing diagram 800, including a relatively short CFP 802, and an immediately-subsequent CP 804. CFP 802 may have a fixed and relatively short duration that does not exceed the time needed to allow exchange of RTS and CTS frames. The duration of CFP 802 include a CFP deferral period, a maximum possible random back-off period, and time for the RTS/CTS exchange.

AMAC may be implemented to permit users to assign a node a relatively short CFP timeslot that is sufficient to send and receive RTS and CTS control packets. Reserving such short time period guarantees the node assigned this short period an opportunity to transmit a packet of any size, up to the maximum transmit unit allowed by the physical layer, at least once every AMAC epoch interval without risk of collisions.

As an example, a maximum size of a data payload plus all protocol headers allowed to be transmitted by a physical layer may be 2312 octets, such as specified in the IEEE 802.11b standard. Periodic epoch intervals may be 1 second. The duration of CFP 802 may be just sufficient to transmit a 20-octet RTS packet and receive a 14-octet CTS packet. This will ensure or guarantee an allotted node will be able to transmit a packet with any size up to maximum allowed 2312 octets every second. In other words, a throughput of $(2.312 \times 8=18.496)$ 18.5 Kbps is guaranteed at the expense of dedicating approximately $((20+14) \times 8=272)$ 275 bps. The entire transmission of the allotted node is protected from collisions because the RTS and CTS messages inform all other nodes within range of the transmitting and receiving radios, of the full duration required to transmit the 2312-octet data packet, as well as an ACK response packet.

With this approach, only 275 bits/second of overall channel capacity is at risk of idleness when a node reserves a short-duration CFP as described above, since other nodes may contend to the channel during CP 804 when the allotted channel of CFP 802 does not have data to send.

Moreover, if the allotted node has less than the maximum data to transmit (e.g., less than 2312 octets), the other nodes may contend for any remaining or unused portion of CP 804, such as with conventional CSMA/CA.

Continuing with the example above, to reserve more than 18.5 kbps, a node may reserve two dedicated short CFPs to transmit up to 37 kbps, with a guaranteed 0.5 second maximum access delay.

AMAC may be implemented to support efficient and fair allocation of channel resources with quality of service (QoS) support in terms of ability to guarantee minimum throughput and/or a maximum access delay for a specific device or node without incurring significant cost when this device is not temporarily unable to utilize channel resources allocated exclusively to the device.

AMAC may be implemented to support fine-grain adaptive channel access control on a packet-per-packet basis with minimal cost when a node does not utilize channel resources allocated for its exclusive use because, when a node is not able to fully utilize its dedicated channel resources, other nodes sharing the common channel may capitalize on an opportunity to reclaim the unutilized portion of the spectrum resources at relatively fine granularity.

AMAC may be implemented to permit a node to reserve specific CFP bandwidth to satisfy a predictable constant bit rate produced by an application.

AMAC may be implemented to permit reservation of a fixed and relatively short CFP, as illustrated in FIG. 5, with full integration of TDM and CSMA/CA access.

2.6. Adaptive Collision Avoidance for Broadcast Packets

Flooding and broadcast traffic play an important role in many packet networks, particularly Internet Protocol (IP) packet networks.

For example, an Address Resolution Protocol (ARP), defined in a Request for Comment 826, published in November, 1982 by the Internet Engineering Task Force (IETP), is a telecommunications protocol to map between IP and MAC addresses. ARP depends on broadcast messages to resolve a specific IP address to a MAC address of a neighboring node.

A network may include mobile forwarding nodes, such as a multi-hop MANET network or other highly dynamic multihop wireless topology. In order to properly forward packets in such a network, an IP route discovery protocol may be used to discover multi-hop paths and/or repair disconnected paths. Multi-hop IP route discovery protocols may flood a network with route-request messages and/or may broadcast to advertise link states to neighboring nodes.

It is not trivial, however, for a broadcasting node to ensure that a transmitted packet has reached all potential destinations within its radio range. For example, a packet transmitted using an omni-directional antenna may be received by one or more receivers, but may experience collisions and interference at other receivers depending on distances and/or noise levels at different locations surrounding the transmitting and receiving nodes. A transmitting node may not be able to sense channel quality at receiving nodes from its current location, and may not be able to assume that the same signal quality applies multiple locations within range of its transmitted signal. A transmitting node thus cannot assume that a transmitted packet has been received at any particular node.

All receivers could be required to transmit acknowledgments of receipt a broadcast packet. This could, however, lead to numerous acknowledgments being sent over the channel, which could result in high incidents of collisions. Even if such collisions are avoided, multiple acknowledgments may nevertheless overload the channel and resources of the packet broadcaster.

A protocol may re-broadcast a message at long intervals to increase the probability that the broadcast message reaches receivers within range. Re-broadcasting of a message may, however, reduce available bandwidth for other nodes that contend for transmission on the shared wireless channel, which may reduce efficient utilization of channel bandwidth.

To minimize applications delays, a MAC design should facilitate ARP broadcasting and broadcasting of route discovery packets without delay. A MAC design should also increase the probability of successful reception of broadcast route discovery and address resolutions packets by receivers within range, such as in a TCP/IP MANET environment.

A conventional CSMA/CA MAC may permit rapid transmissions of broadcast traffic. In a multi-hop wireless environment, however, a conventional CSMA/CA MAC may not provide any protection from collisions for broadcast traffic. In such a network, even under light channel loads, broadcast traffic packets may be vulnerable to hidden nodes collisions, and it may not be feasible to rely upon RTS/CTS exchanges to protect against hidden nodes collisions. Under heavy load conditions, all traffic may be vulnerable to collisions, and it may not be feasible to detect collisions of broadcast traffic. As a result, conventional TCP/IP MANET networks may spend excessive amounts of time and channel bandwidth attempting to discover and repair routes, even when a current path between a source and destinations has not changed, such as when a segment of a current path experiences a heavy load.

AMAC may include adaptive broadcast collision protection (ABCP), which may balance rapid transmission of broadcast packets with reduction of probability of collisions for broadcast packets.

With ABCP, each node may measure or estimate a congestion level within a range of the corresponding node. Channel congestion may be determined with respect to aggregate duration of channel CSMA/CA idle time relative to total CSMA/CA access/busy duration, within a periodic epoch interval.

A channel may be considered idle for a period of time when the period of time does not overlap with a CFP or the duration of a packet transmitted or received by any node within range of the measuring node.

Each node may track channel non-idle, or busy times when the node receives a RTS, CTS, or data packet transmitted within range of the node. A duration field in a header of the transmitted data packet may be used to determine when the channel will be idle.

A node may consider the channel congested when a level of interfering signal exceeds a physical layer receiver sensitivity threshold. Each node may maintain a moving window of time within an epoch, and may estimate a ratio of channel busy time to overall epoch interval within the window of time, and the channel may be considered congested when the ratio reaches or exceeds a BroadcastInCFP_RatioThreshold.

When the channel is considered congested by a node that has at least one CFP allocated within the epoch, the node may be precluded from transmitting broadcast packets from an upper layer except during the corresponding allocated CFP(s). Transmission preclusion may reduce the probability of declaring multi-hop routes stale by a network layer protocol. When a route actually fails, due to mobility and/or other factors, transmission preclusion may increase the probability of discovering an alternate route before impacting upper layers timers at transport layer protocols, such as TCP timers where unacceptable performance and potential failures by end user applications often occur.

A value of the DefaultBroadcastInCFP_RatioThreshold may be configurable, such as to define multiple levels of congestion.

Figure 9:
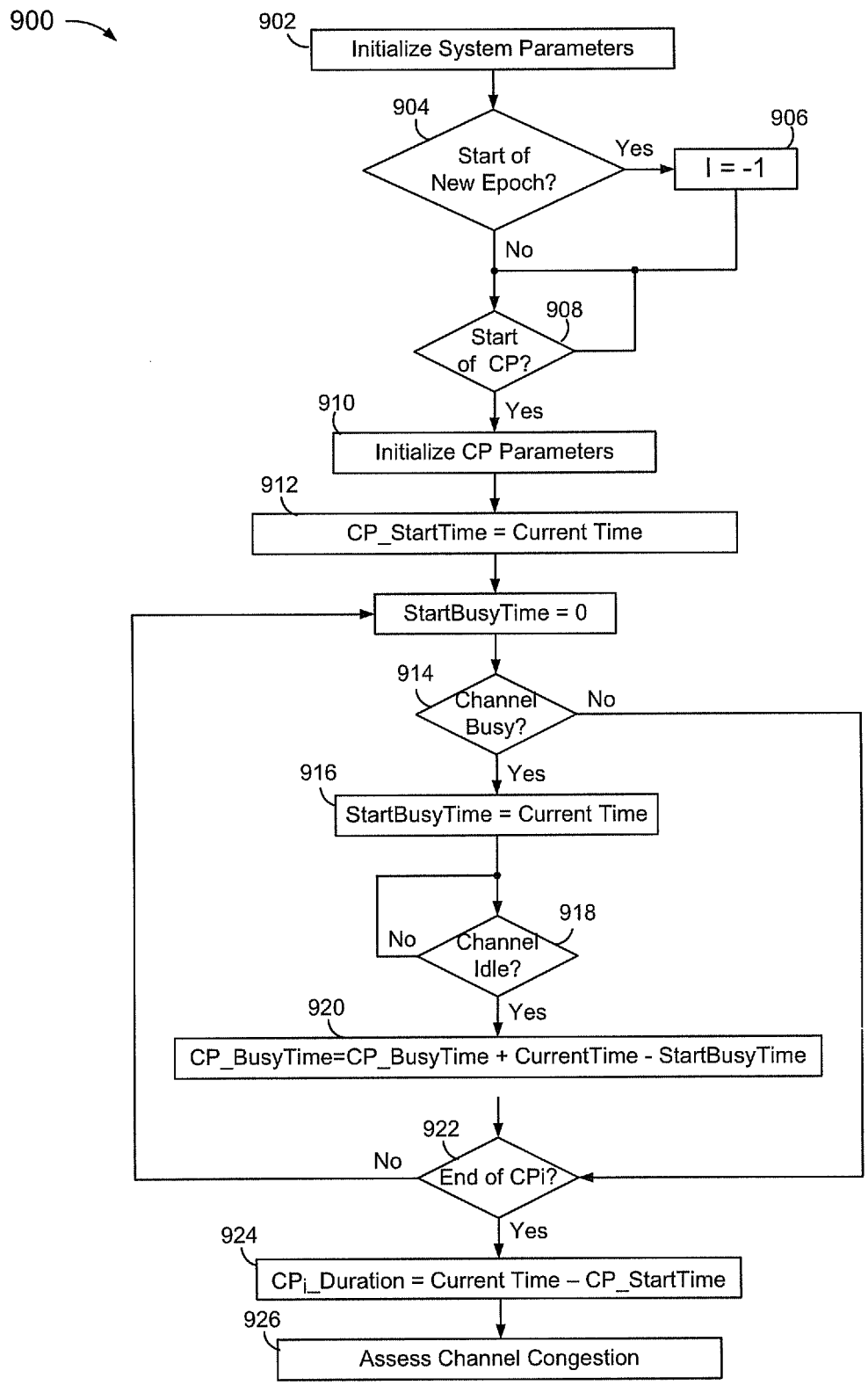
FIG. 9 is a flowchart of a method 900 of assessing channel busy time during contention periods.

FIG. 9 is a flowchart of a method 900 of assessing channel busy time.

Method 900 is described below as performed by a node, referred to herein as a local or measuring node. Method 900 may be implemented with respect to each of multiple nodes of a network.

At 902, parameters values are set.

The parameters may include a CP count, i, to count contention periods within an epoch, which may be set to i=−1.

The parameters may include the BroadcastInCFP_RatioThreshold, described above, which may be set to a default value, illustrated here as DefaultBroadcastCFP_RatioThreshold.

The parameters may include the CongestedChannelFlag described above, which may initially set to false.

The parameters may include a TotalCSMACADuration to track aggregate channel CSMA/CA idle times during an epoch.

The parameters may include a TotalCSMACABusyDuration to track total CSMA/CA access/busy times during the epoch.

The parameters may include a $CP_{i\_Duration}$ to track durations of each CP within an epoch, which may be initially set to 0 for all i.

The parameters may include a $CP_{i\_BusyDuration}$ to track CSMA/CA access/busy times during each CP of an epoch, which may be set to 0 for all i.

The parameters may be initialized as follows:

BroadcastInCFP_RatioThreshold=DefaultBroadcastinCFP_RatioThreshold

CongestedChannelFlag=False

TotalCSMACADuration=0

TotalCSMACABusyDuration=0

$\forall CP_{i\_Duration}=0$; and $\forall CP_{i\_BusyDuration}=0$ i=−1

The prototype AMAC system described above uses the following parameter values:
 DefaultBroadcastInCFP_RatioThreshold=0.30
 BroadcastInCFP_RatioThreshold=DefaultBroadcastIn
   CFP_RatioThreshold;
 CongestedChannelFlag=False;
 TotalCSMACADuration=0; and
 TotalCSMACABusyDuration=0.

At 904, upon the start of a new epoch at the measuring node, processing proceeds to 906, where i is set to i=−1. Processing may then proceed to 908. During an epoch, processing may proceed from 904 to 908.

At 908, upon the start of a contention period (CP), parameter values may be updated.
 i=i+1;
 TotalCSMACADuration=(TotalCSMACADuration)−
  (CPi_Duration);
 TotalCSMACABusyDuration=(TotalCSMACABusyDuration)−(CPi_BusyDuration);
 CPi_Duration=CP_Duration;
 TotalCSMACADuration=(TotalCSMACADuration)+
  (CPi_Duration);
 Cpi_BusyDuration=0;
 CP_BusyTime=0; and
 CP_StartTime=Current Time.

At 912, a StartBusyTime parameter is initialized to 0.

At 914, the measuring node determines whether a shared channel is busy. The determination may be based on a received RTS, CTS, and/or data packet. The measuring node may determine when the channel will be idle based on a duration field of a header of a received data packet.

When the channel is idle at 914, may return to 912, through 922, to continue monitoring the channel for traffic.

When the channel is busy at 914, processing proceeds to 916 to assess a time for which the channel remains busy.

At 916, the StartBusyTime parameter is set to a current time. This provides a time-stamp for the start of busy time.

At 918, when the channel is not longer busy, processing proceeds 920, where busy period time is computed as:

CP_BusyTime=CP_BusyTime+CurrentTime−Start-
  BusyTime.

At 922, if the CP is not over, processing returns to 912, to continue monitoring channel traffic.

At the end of the CP, the duration of the CP may be determined at 924 as:

$CP_i$_Duration=(Current Time)−(CP_StartTime).

At the end of the CP, processing proceeds to 924, where

At 926, an assessment of channel congestion may be made and/or revised based on busy times of the CP, such as described below with reference to FIG. 10.

Figure 10:
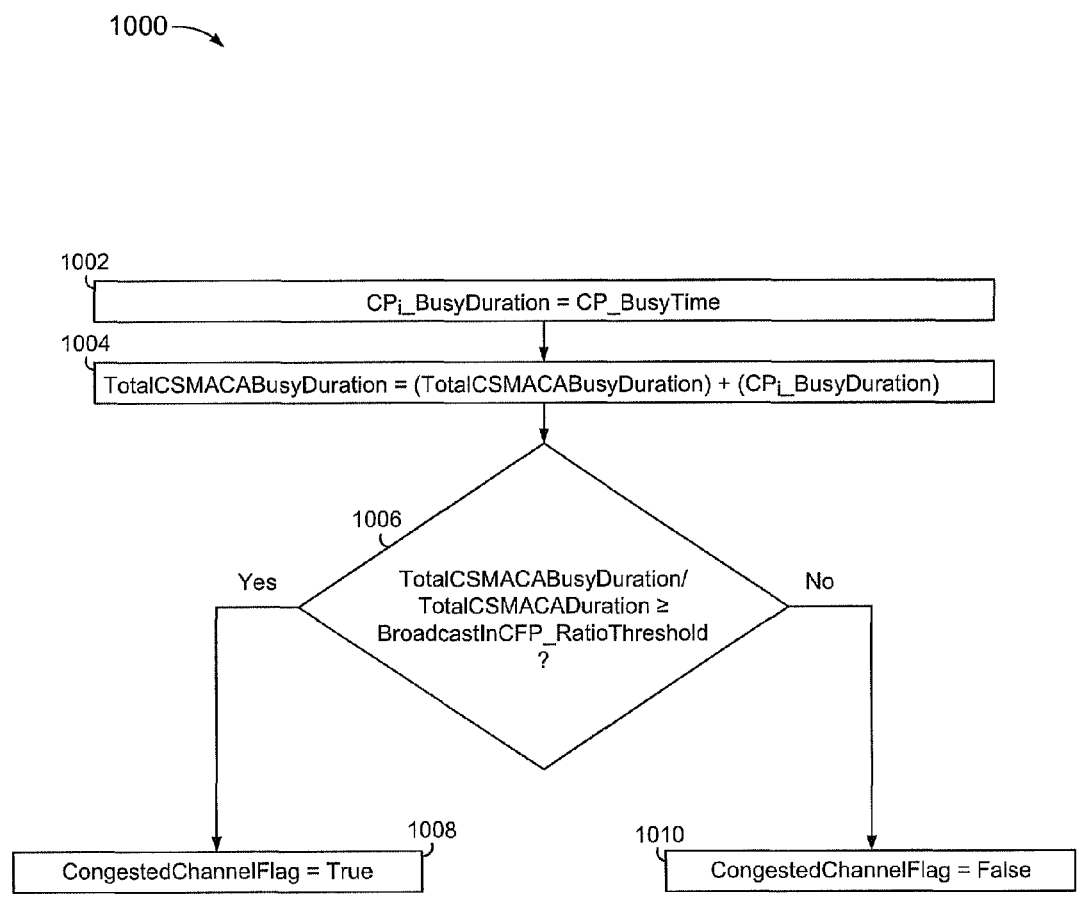
FIG. 10 is a flowchart of a method of assessing channel congestion based on an aggregate duration of channel busy time relative to an elapsed time of an epoch.

FIG. 10 is a flowchart of a method 1000 of assessing channel congestion based on an aggregate duration of channel idle time relative to the total access/busy duration within an epoch. Method 1000 may be performed for each of multiple nodes of a network. Method 1000 is described below with reference to features described above with reference to FIG. 9. Method 100 is not, however, limited to the example of FIG. 9.

At 1002, a busy duration of a $CP_i$ may be determined as the CP_BusyTime described above with respect to 920 in FIG. 9.

At 1004, a total or aggregate busy duration of the epoch may be determined or revised based on busy duration of CP, and any prior CP's of the epoch, which may be represented as:

TotalCSMACABusyDuration=(TotalCSMACABusy-
  Duration)+($CP_i$_BusyDuration).

At 1006, a channel congestion factor may be computed, or re-computed based on CPi, as a ratio of aggregate channel busy time to a corresponding elapsed time of the epoch. The ratio may be computed as:

(TotalCSMACABusyDuration)/(TotalCSMACADura-
  tion).

TotalCSMACABusyDuration may be determined as described above.

TotalCSMACADuration may be determined as:

TotalCSMACADuration=(TotalCSMACADuration)−
  ($CP_i$_Duration).

The congestion factor may be compared to a threshold, such as the BroadcastInCFP_RatioThreshold described above.

Where the congestion factor is equal to or greater than the threshold, the channel may be assessed as congested. In FIG. 10, this is illustrated as setting a CongestedChannelFlag to true at 1008.

Where the congestion factor is less than the threshold, the channel may be assessed as uncongested. In FIG. 10, this is illustrated as setting a CongestedChannelFlag to false at 1010.

Method 900 may be implemented with CPs for which start times and/or durations are static, identical, and/or vary amongst nodes that share a channel across a multi-hop wireless network.

Method 900 may thus be implemented in a system that adapts the AMAC non-contiguous/alternating configuration of contention and contention-free periods where access to channel may start inside a CFP and may continue into the next adjacent CP regardless of how the CFPs and CPs are assigned to nodes. The method is suitable for systems that assign CFPs and CPs globally and statically in a centralized fashion for use in single and multi-hop networks as well as systems that assign CFPs and CPs dynamically on demand in a single and multi-hop networks. For example, the DMAC protocol model was leveraged in the reference implementation of this adaptive AMAC channel congestion detection method, This AMAC congestion avoidance method allowed nodes in the same cluster to handle different counts and timing of CPs based on their location within DMAC cluster, and as result reach different conclusions on current congestions state of the channel within the cluster. As such, DMAC border nodes (nodes at boundary of multiple adjacent clusters) will observe multiple incidents of epoch starts within their local epoch period. The border nodes that observe several DMAC scheduled and contended beacon periods that are unique for each cluster, as result most likely will observe different counts of CFPs and CPs per epoch interval compared to adjacent non-border nodes within their cluster.

Figure 11:
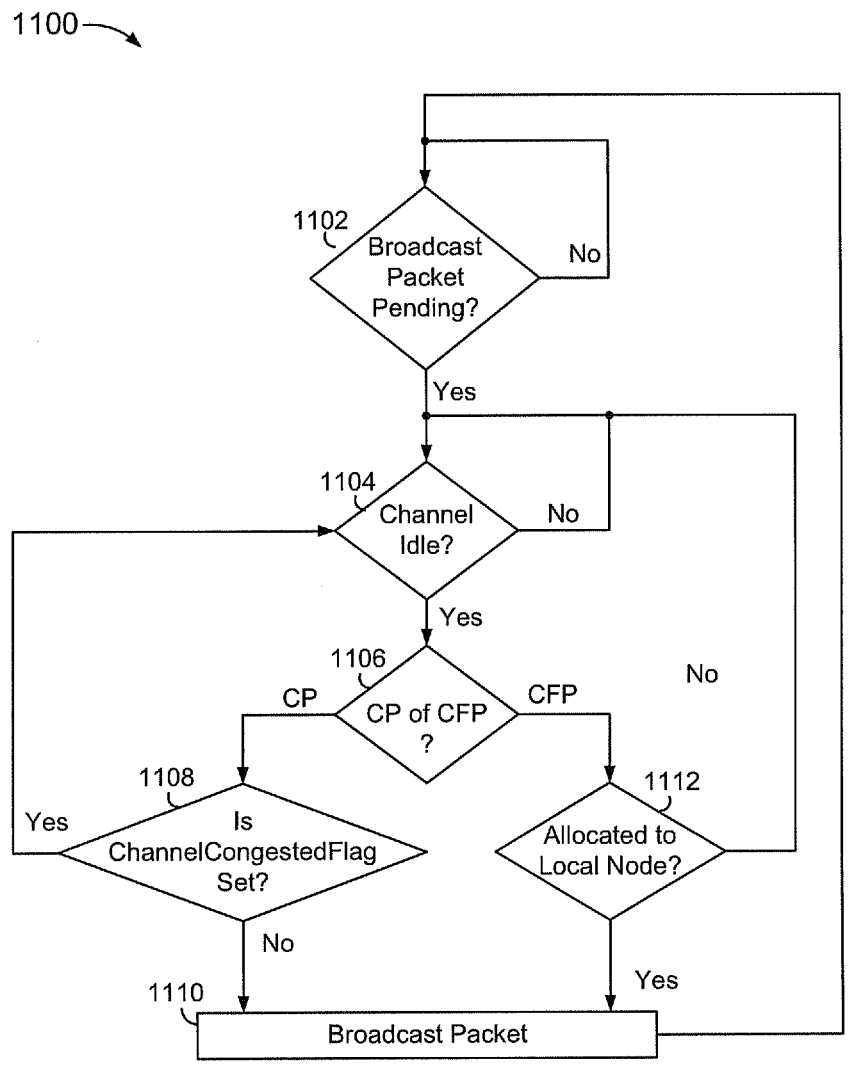
FIG. 11 is a flowchart of a method of adaptively reducing a probability of collisions for broadcast transmission based upon a node-specific measure of channel congestion.

FIG. 11 is a flowchart of a method 1100 of adapting broadcast transmission techniques to reduce a probability of collision. More particularly, a packet may be broadcast during a CFP when available, and selectively during a CP depending upon a node-specific measure of channel congestion.

At 1102, when an upper layer broadcast packet is pending at a node, processing proceeds to 1104.

At 1104, the node may need to wait for the channel to be idle.

At 1106, if the channel is in a CP, processing proceeds to 1108 to determine whether the channel is congested. The determination may be based on whether the ChannelCongestedFlag is set to true or false, as described above with respect to FIG. 10.

If the channel is congested at 1108, processing returns to 1104 to wait for another channel idle time. If the channel is not congested at 1108, processing proceeds to 1110, where the packet is broadcast during the CP.

At 1106, if the channel is in a CFP, processing proceeds to 1112. If the CFP is allocated to the local node, processing proceeds to 1110, where the packet is broadcast during the CFP and/or during a subsequent CP, such as described above with respect to one or more of FIGS. 4 and 8.

2.7. Adaptive Collision Avoidance for Unicast Packets

A convention wireless contention-based MAC, such as IEEE 802.11 CSMA/CA, performs poorly under heavy load conditions and induces undesirable cross-layer interactions when used in multi-hop environments. For example, many CSMA/CA MACs employ an exponential back-off scheme for congestion avoidance and collisions recovery. In this standard CSMA/CA congestion avoidance approach, when a node attempts to send a packet to a neighboring node using the CSMA/CA access method the transmitting node considers its attempt a failure if it does not receive an RTS or an ACK response from the intended receiving node in a certain time period. When this occurs, the transmitting node assumes that its packet experienced collision at the receiving node from interfering signals or competing nodes transmissions. In IEEE 802.11 specification, a transmitter is allowed to attempt to retransmit a packet up to seven times using CSMA/CA access. However, with each successive retransmission attempt the transmitter is required to double the size of the Contention Window (CW) used to select the random-back-off period duration where the medium should remain idle before transmitting the packet. IEEE 802.11 standard sets the initial CW size to 7 with maximum allowed CW size of 256.

Figure 12:
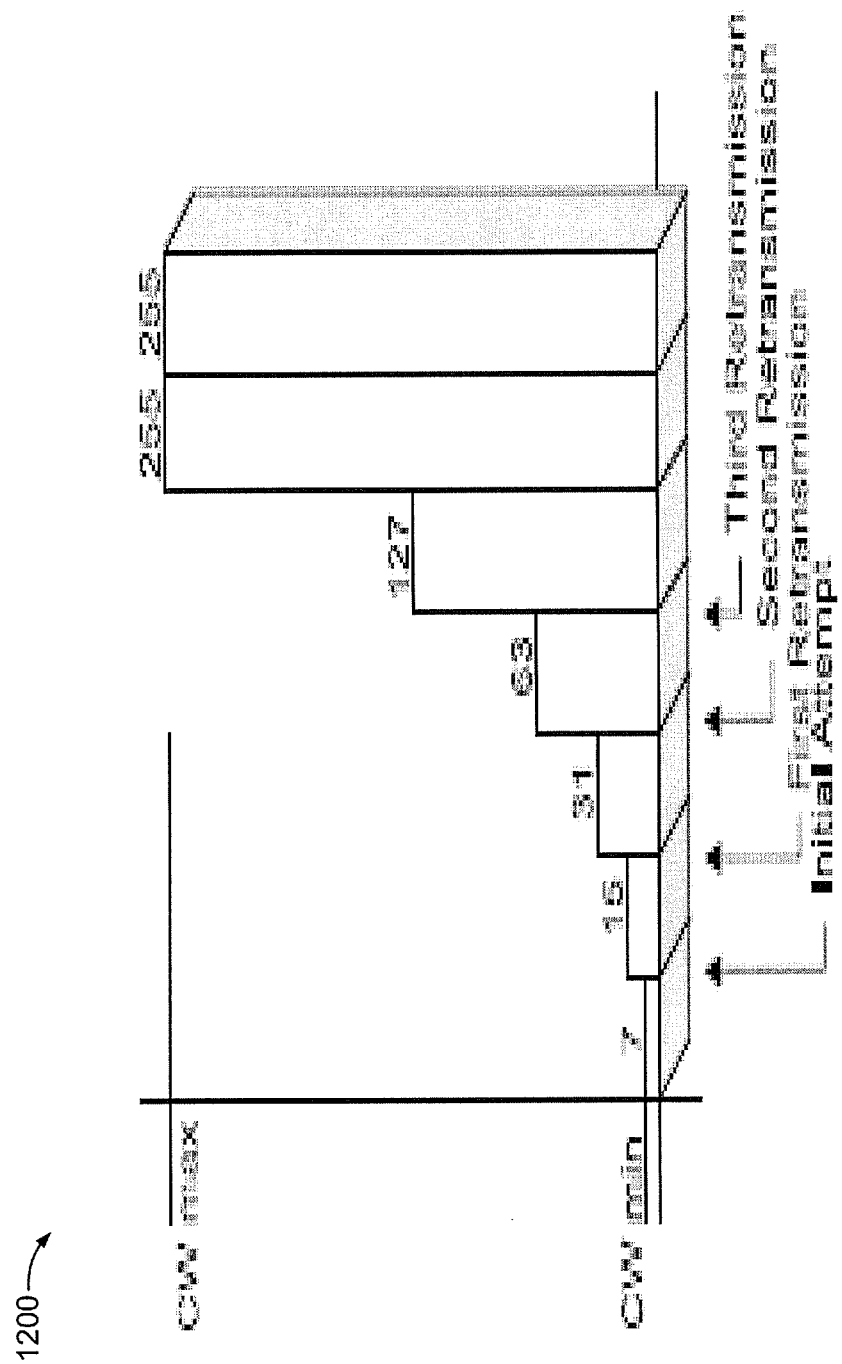
FIG. 12 is a graph to illustrate an IEEE 802.11 standard retransmission exponential back-off contention window increase.

FIG. 12 is a graph 1200 to illustrate an IEEE 802.11 standard retransmission exponential back-off contention window increase.

After a 7th retransmission attempt fails, the next upper layer, network, is informed that packet transmission to the neighboring node has failed. Typically this event will cause the routing protocols at the network layer to assume that a change in topology has occurred due to potential link failure, or as a result of node mobility. This causes the routing protocol to initiate a route discovery process, which floods the network with route-request broadcast messages.

In many occasions, however, the route discovery process may not be necessary because the network topology did not change. Rather, the transmission failure was caused by excessive collisions; high collisions incidents typically occur as transmission load increases from multiple competing nodes sharing a common wireless channel.

Under these conditions, any initiation of unnecessary route-discovery process will exacerbate the channel congestion condition already experienced by competing nodes. Worst yet, under heavy congestion levels, the routing protocols most likely will fail to discover a path for the failed destination. In the mean time, upper layer protocols such as TCP, or any other application specific protocol, with support for flow control and guaranteed packet delivery will rapidly reduce its data rate, initiate data packet retransmission, and may eventually suffer from a connection time-out. This causes severe performance degradation for the end-user applications, and potentially mission failure.

In contrast, AMAC may include an adaptive collision avoidance scheme for unicast packets, which may be implemented with respect to unicast re-transmissions from a node that is assigned at least one CFP. AMAC may provide that, when the node does not receive an expected acknowledgement of a unicast packet transmission, the node may re-transmit the packet during subsequent CPs and/or CFPs, up to a first threshold number of times. The first threshold is denoted herein as UnicastInCFPlimit. Thereafter, the node may re-transmit the packet only during allocated CFPs. Subsequent re-transmissions during allocated CFPs, or a total number of re-transmissions, may be limited to a second threshold number, denoted herein as MaxUnicastAttemptsAllowed.

This may protect subsequent retransmissions of the packet from potential collisions, and may permit the node to more-gracefully adapt to transient congestion events. This may also benefit other nodes in contention for the subsequent CPs, since a reduction in congestion may reduce the chances of collisions and may increase the probability of successfully transmissions from the other nodes. This may also provide significant efficiency improvement by reducing, minimizing, and/or avoiding collisions, long random back-off periods, undesirable cross layer interactions, network induced congestions caused by routing instability, and/or degradations in performance for transport layer protocols and user applications.

Figure 13:
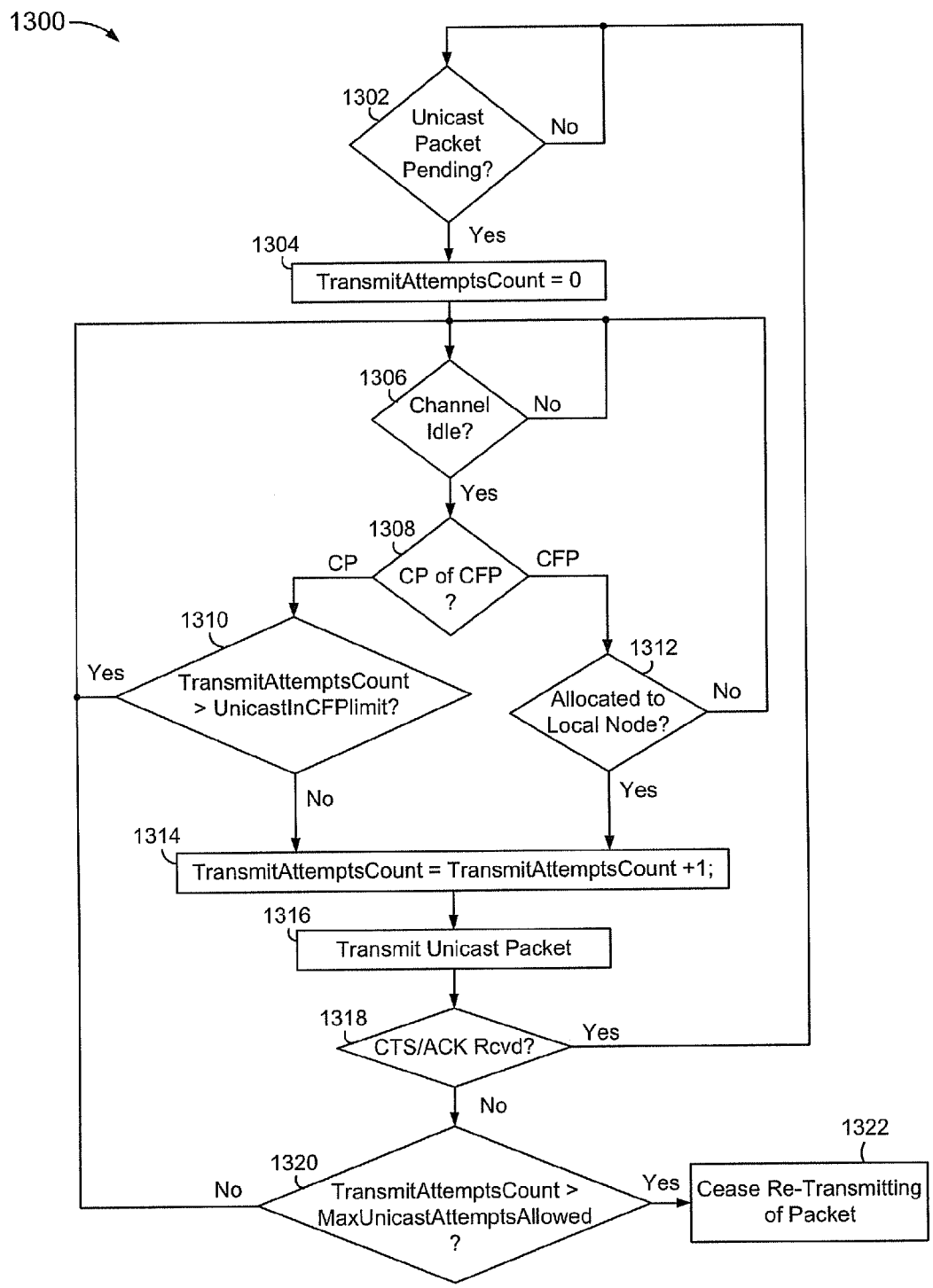
FIG. 13 is a flowchart of a method of adaptively reducing a probability of collisions for unicast packets.

FIG. 13 is a flowchart of a method 1300 of adaptively avoiding collisions for unicast packets. Method 1300 may be implemented with respect a node that is assigned at least one CFP.

At 1302, when an upper layer unicast packet is pending at a node, processing proceeds to 1304, where a count, illustrated here as TransmitAttemptsCount, is initialized.

At 1306, the node may need to wait for the channel to be idle.

At 1308, if the channel is in a CP, processing proceeds to 1310.

At 1310, if the number of transmission attempts, TransmitAttemptsCount, exceeds the first threshold, UnicastInCFPlimit, processing returns to 1306 to wait for another channel idle time. Otherwise, processing proceeds to 1314, where TransmitAttemptsCount is incremented.

Returning to 1308, if the channel is in a CFP, processing proceeds to 1312 and, if the CFP is allocated to the local node, processing proceeds to 1314, where TransmitAttemptsCount is incremented as described above. If the CFP is not allotted to the local node at 1312, processing returns to 1306 to wait for another channel idle time.

After incrementing TransmitAttemptsCount at 1314, processing proceeds to 1316, where the unicast packet is transmitted.

At 1318, if the local node receives a response to the transmission, such as a CTS and/or acknowledgment, no further action needs to be taken with respect to the transmitted packet. If the local node does not receive a response to the transmission, processing proceeds to 1320, where the number of transmission attempts, TransmitAttemptsCount, is compared to the second threshold, MaxUnicastAttemptsAllowed.

When the number of transmission attempts is below the second threshold, processing returns to 1306 to wait for another channel idle time to re-transmit the packet.

As can be seen from FIG. 13, when the number of transmission attempts is between the first and second thresholds, UnicastInCFPlimit and MaxUnicastAttemptsAllowed, the node will be precluded from re-transmitting the packet during CPs at 1312, but will be permitted to re-transmitting the packet during CFPs through 1316.

An ACCA control, such as illustrated in FIG. 13, may be configurable, such as to provide more-responsive congestion and collision avoidance capability for unicast traffic, and/or to improve utilization efficiency of a shared channel.

An ACCA control may be implemented, for example, to select and/or adjust one or more ACCA parameters based on a level of congestion in a shared channel. For example, UnicastInCFPlimit and/or MaxUnicastAttemptsAllowed, described above with respect to FIG. 13, may be configurable based on a level of channel congestion.

A configurable ACCA control may be selectively invoked to operate in a dynamic mode, where the threshold may vary, or a static mode, where the threshold may remain fixed. For example, where a node employs method 1300 for unicast packets, the node may selectively operate in either a static mode, in which thresholds UnicastInCFPlimit and MaxUnicastAttemptsAllowed, are fixed, or in a dynamic mode, in which one or both of UnicastInCFPlimit and MaxUnicastAttemptsAllowed are configurable. In both modes, the number of permitted re-transmissions is limited by UnicastInCFPlimit and MaxUnicastAttemptsAllowed. In dynamic mode, however, the number of permitted re-transmission may vary depending upon the level of channel congestion.

Figure 14:
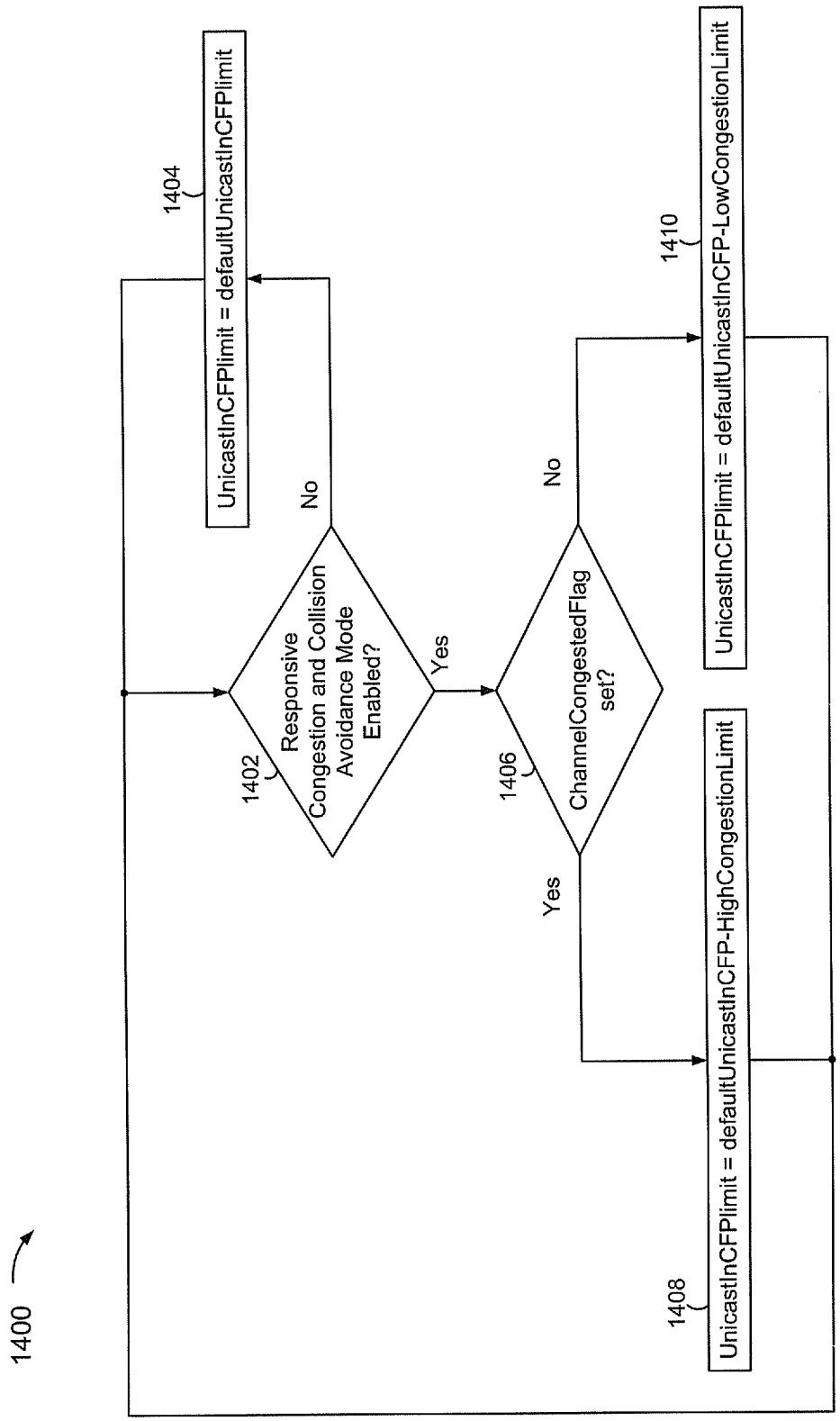
FIG. 14 is a flowchart of a method of selectively operating in a static or dynamic collision avoidance mode for unicast transmissions.

FIG. 14 is a flowchart of a method 1400 of selectively operating in a dynamic ACCA mode or a static ACCA mode. In the example of FIG. 14, UnicastInCFPlimit is variable in dynamic mode. Alternatively, or additionally, MaxUnicastAttemptsAllowed may be variable in the dynamic mode.

At 1402, when an static ACCA mode is enabled or selected, processing proceeds to 1404, where the threshold UnicastInCFPlimit is set to a default value, illustrated here as defaultUnicastInCFPlimit.

When a dynamic or responsive ACCA mode is enabled or selected at 1402, processing proceeds to 1406.

At 1406, a level of channel congestion is assessed. The assessment may be based on the ChannelCongestedFlag described above. When channel congestion is relatively high, such as when ChannelCongestedFlag is set, or true, processing proceeds to 1408.

At 1408, UnicastInCFPlimit is set to a relatively high value, illustrated here as defaultUnicastInCFP_HighCongestionLimit.

Returning to 1406, when channel congestion is relatively low, such as when ChannelCongestedFlag is not set, or false, processing proceeds to 1410.

At 1410, UnicastInCFPlimit is set to a relatively low value, illustrated here as defaultUnicastInCFP_LowCongestionLimit.

The prototype AMAC system described above utilizes the following parameter values:
defaultUnicastInCFPlimit=3;
defaultUnicastInCFP_HighCongestionLimit=5; and
defaultUnicastInCFP_LowCongestionLimit=2.

Methods and systems disclosed herein are not, however, limited to these example values.

UnicastInCFPlimit, and/or MaxUnicastAttemptsAllowed may be re-computed from time to time, periodically, and/or in response to a condition, such as a change in ChannelCongestedFlag.

Current values of UnicastInCFPlimit and MaxUnicastAttemptsAllowed may be applied in method 1300.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 15:
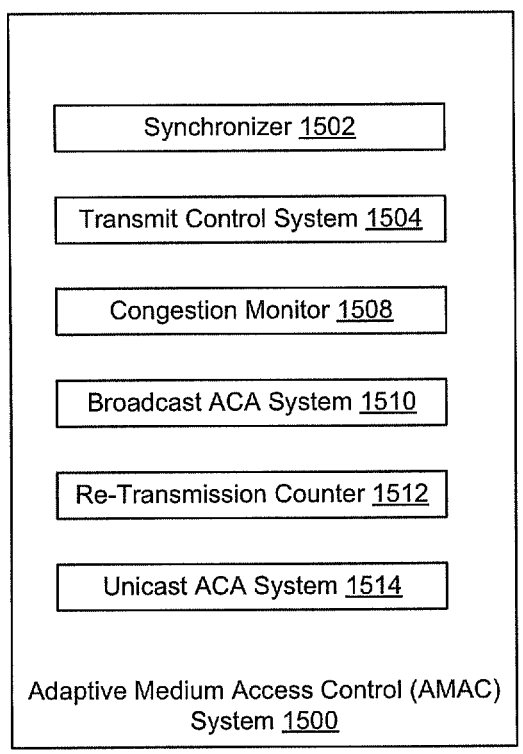
FIG. 15 is a block diagram of an adaptive medium access control (AMAC) system.

FIG. 15 is a block diagram of an adaptive medium access control (AMAC) system 1500, which may be implemented within a medium access controller (MAC).

System 1500 includes a synchronizer 1502 to synchronize periodic epochs of time and a state of a schedule amongst the nodes, such as described in one or more examples herein. The schedule includes alternating contention periods and contention free periods within the epochs, and wherein each contention free period is allocated to one of the nodes;

System 1500 further includes a transmit control system 1504 to initiate a transmission during a contention free period allocated to the node, and complete the transmission during an immediately-subsequent contention period, such as described in one or more examples herein.

System 1500 further includes a congestion monitor 1508 to measure busy times of the contention periods, aggregate the measured busy times over durations of corresponding epochs, and maintain an aggregate channel congestion factor over the duration of the corresponding epochs as a function of an elapsed time of the epoch and a corresponding aggregate of the measured busy times of contention periods within the epoch, such as described in one or more examples herein.

System 1500 further includes a broadcast control system 1510 to preclude broadcasting of a packet from the node during a contention period when the channel congestion factor is above a configurable congestion factor threshold, such as described in one or more examples herein.

System 1500 further includes a counter 1512 to maintain a count of a number of times a unicast packet is re-transmitted from the node, such as described in one or more examples herein.

System 1500 further includes a unicast control system 1514 to preclude re-transmission of the unicast packet from the node during a contention period when the count reaches a first count threshold, such as described in one or more examples herein.

Figure 16:
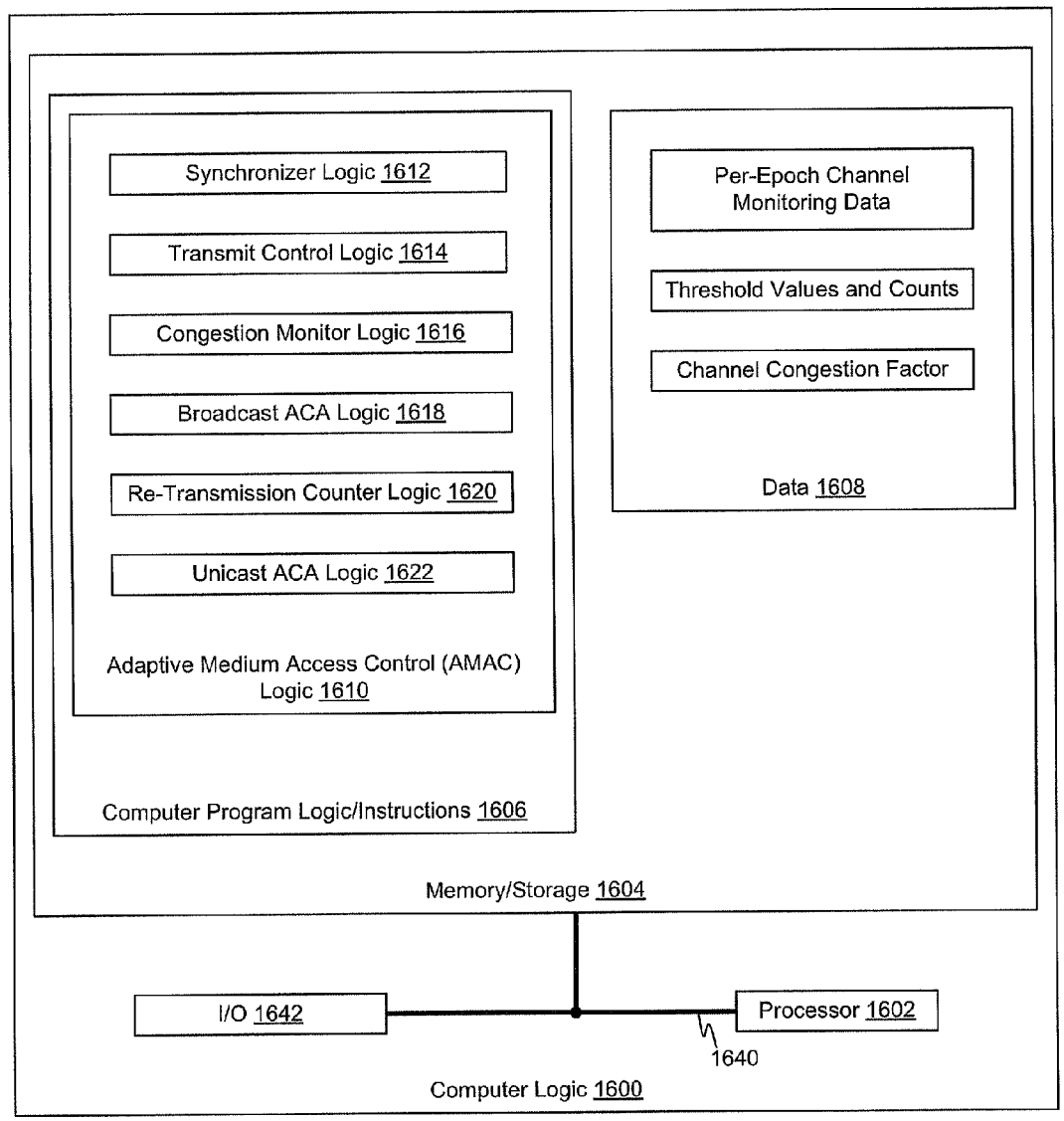
FIG. 16 is a block diagram of a computer system 1500, configured to system to adaptively access a shared wireless channel of an ad hoc wireless network on behalf of a node of the network.

FIG. 16 is a block diagram of a computer system 1500, configured to system to adaptively access a shared wireless channel of an ad hoc wireless network on behalf of a node of the network.

Computer system 1600 includes one or more computer instruction processing units, illustrated here as a processor 1602, to execute computer readable instructions, also referred to herein as computer program logic.

Computer system 1600 may include memory, cache, registers, and/or storage, illustrated here as memory 1604, which may include a computer readable medium having computer program logic 1606 stored therein.

Memory 1604 may includes data 1608 to be used by processor 1602 in executing logic 1606, and/or generated by processor 1602 in response to execution of logic 1606.

In the example of FIG. 16, logic 1606 includes adaptive medium access control (AMAC) logic 1610.

AMAC logic 1610 includes synchronizer logic 1612 to cause processor 1602 to synchronize periodic epochs of time and a state of a schedule amongst the nodes, such as described in one or more examples herein. The schedule includes alternating contention periods and contention free periods within the epochs, and wherein each contention free period is allocated to one of the nodes;

AMAC logic 1610 further includes transmit control logic 1614 to initiate a transmission during a contention free period allocated to the node, and complete the transmission during an immediately-subsequent contention period, such as described in one or more examples herein.

AMAC logic 1610 further includes congestion monitor logic 1616 to measure busy times of the contention periods, aggregate the measured busy times over durations of corresponding epochs, and maintain an aggregate channel congestion factor over the duration of the corresponding epochs as a function of an elapsed time of the epoch and a corresponding aggregate of the measured busy times of contention periods within the epoch, such as described in one or more examples herein.

AMAC logic 1610 further includes broadcast control logic 1618 to preclude broadcasting of a packet from the node during a contention period when the channel congestion factor is above a configurable congestion factor threshold, such as described in one or more examples herein.

AMAC logic 1610 further includes counter logic 1620 to maintain a count of a number of times a unicast packet is re-transmitted from the node, such as described in one or more examples herein.

AMAC logic 1610 further includes unicast control logic 1622 to preclude re-transmission of the unicast packet from the node during a contention period when the count reaches a first count threshold, such as described in one or more examples herein.

Computer system 1600 may include a communications infrastructure 1640 to communicate amongst components of computer system 1600.

Computer system 1600 may include an input/output interface controller 1642 to interface with one or more other systems.

3. AMAC Performance Analysis Approach and Results

Performance of the prototype AMAC system is described below, including analysis approaches and results. Methods and systems disclosed herein are not, however, limited to the prototype AMAC system.

The prototype AMAC system was designed for integration into a network simulator known as a Network Simulator II, or NS2, to analyze protocol performance in-use within multi-hop MANET environment and to assess interactions across layers of TCP/IP protocol stack.

NS2 is an open source discrete event simulator for networking research. NS2 provides substantial support for simulation of TCP, UDP, routing, and multicast protocols over wired and wireless (local and satellite) networks. NS2 includes capability to handle mobile nodes, and includes support for experiment scripting enabling fine control over experiment scenarios. The NS2 script interface allows scheduling of traffic start and stop times, placement and movements of nodes over time and space. The NS2 script interface also allows configuration of a network and the nodes in terms of used application, transport, routing and MAC protocols. The NS2 includes packets tracing and logging infrastructure, allowing detailed examination of network behaviors on a packet per packet basis. Furthermore, there are several supporting utilities that were contributed to by the open source community to enhance analysis, debugging, and productivity. Two such tools used in the analysis of the prototype AMAC system are a NAM network topology visualization tool and a Xgraph plotting tool.

NAM allows visual examination of network nodes as they move around a two dimensional test area. It uses movement and packet trace events produced by the network simulation in a NAM formatted event trace file that can be used later by the NAM utility to display nodes as they move in the two dimensional space and also to depict packet transmissions between nodes. NAM was the primary tool for verifying and validating our scripted node placement and mobility logic to ensure conformance to the goals of each experiment.

The Xgraph tool provides automatic charting of traffic parameters and event counts that are produced as a byproduct of any network experiment. Xgraph was used for visual analysis and examination of experiment results.

Figure 17:
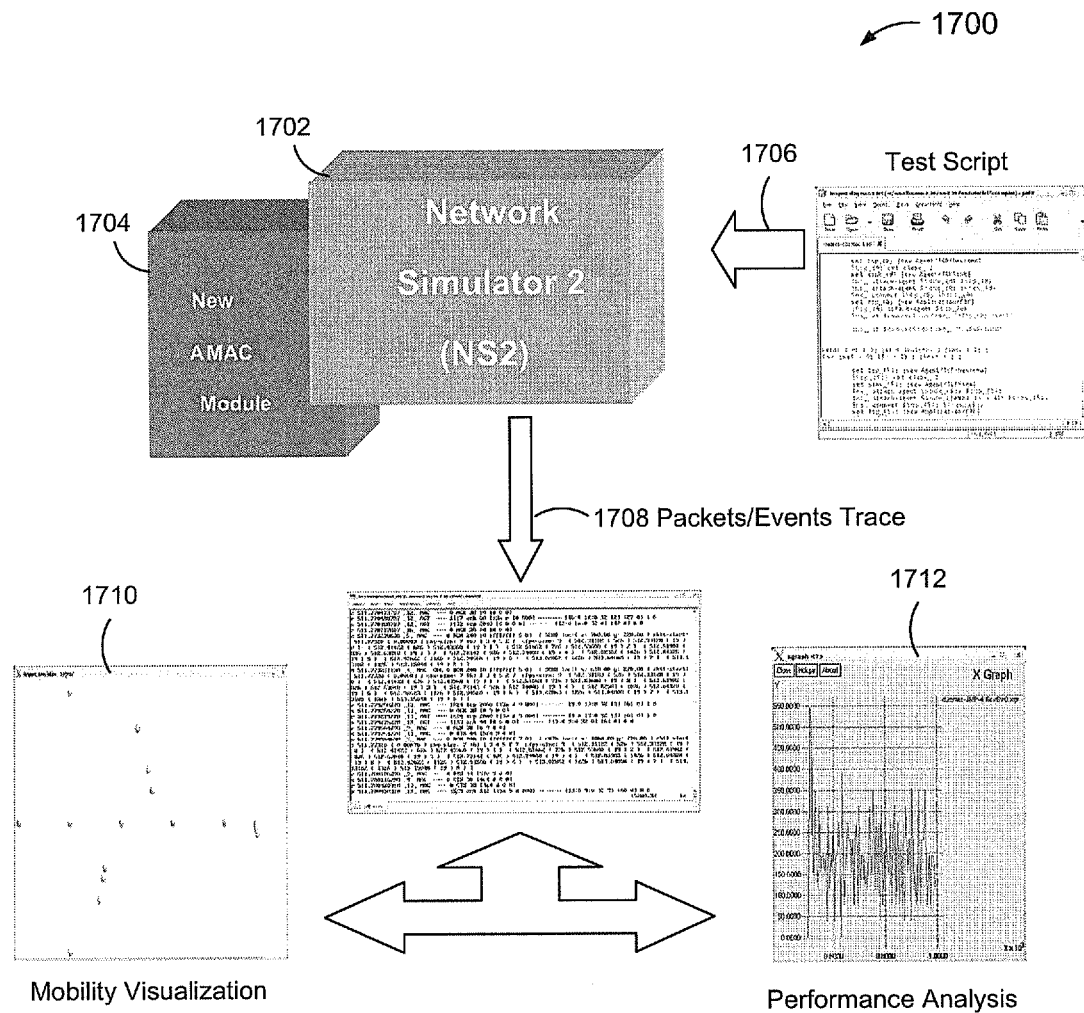
FIG. 17 is a depiction of an AMAC NS2 model, including an NS2 network simulation framework and a prototype AMAC system.

FIG. 17 is a depiction of an AMAC NS2 model 1700, including an NS2 network simulation framework 1702 and the prototype AMAC system 1704. In FIG. 17, NS2 1702 receives script logic 1706 and outputs trace and log files 1708 used by the NAM and Xgraph tools. FIG. 17 also depicts output of these tools as node mobility/network topology visualization utility plots 1710 and performance analysis plots 1712.

Several NS2 experiments were executed to measure AMAC performance for various multi-hop ad-hoc mesh topologies.

3.1. Cross Layer Interactions with TCP Protocol

AMAC NS2 model 1600 was used to study interactions between an AMAC MAC sub-layer protocol and a TCP transport layer protocol when operating in a multi-hop wireless environment.

Poor performance of the TCP transport layer protocol over multi-hop wireless network is a well-studied topic.

Researchers have coined the term "TCP Channel Capture Problem" to describe the unfair distribution of wireless network capacity when TCP flows compete for a common channel capacity in multi-hop wireless network using a standard IEEE 802.11 MAC., such as described in, K. Xu, et al., "TCP Behavior across Multihop Wireless Networks and the Wired Internet," Proceedings of the 5th ACM Internal Workshop on Wireless Mobile Multimedia.

Several studies using experiments and network simulations indicate that TCP flows with fewer hops between source and destination tend to starve TCP flows with longer paths when paths of these, long and short, TCP flows intersect and compete for common channel resources in a multi-hop wireless network. K. Xu, et al., discusses the fundamental causes of these TCP unfairness problems and observes that the causes of these issues are rooted in design decisions made at the MAC layer, including hidden nodes and exposed node problems, and adverse interactions between MAC congestion avoidance and TCP flow control mechanisms.

K. Xu, et al., identifies challenges of attempting to adjust TCP timers and control flow configuration when TCP flows traverse a network with wired and multi-hop wireless segments. Wired IP network segments need efficient support for long round trip delay, while multi-hop wireless segments need TCP settings that assume a short round trip delay to avoid channel capture and unfair distribution of bandwidth among competing flows. Solving these TCP protocol performance issues is critical for many applications. TCP is used by almost all internet applications that rely on guaranteed packet delivery service. Examples of higher layer applications protocols that rely on TCP reliable transport protocol include SIP for IP telephony signaling for VOIP call setup, HTTP protocol for web browsing, FTP file transfer service, mail services, and SOA applications protocols for distributed computing.

Traffic monitoring and analysis studies show that 90% of bytes transferred in the internet are moved by TCP protocol flows, as described in M. Kim, et al., "Characteristics of the internet Traffic from the perspective of flows," Computer Communications, Vol. 29, Issue 10, 19 Jun. 2006.

Developing a MAC solution that alleviates these TCP problems in multi-hop wireless networks is an important step towards viable communication networks with wired and wireless segments offering multi-hop MANET. Such capability would help to enable many promising civilian and military applications. A viable MAC solution should scale to allow use by a large number of nodes deployed over wide geospatial area in challenging terrains.

3.2. AMAC Fairness and Channel Capture Problem Performance for TCP Traffic

NS2 experiments were designed to evaluate AMAC fairness and performance when multiple TCP flows compete for the common channel in multi-hop wireless deployment.

Figure 18:
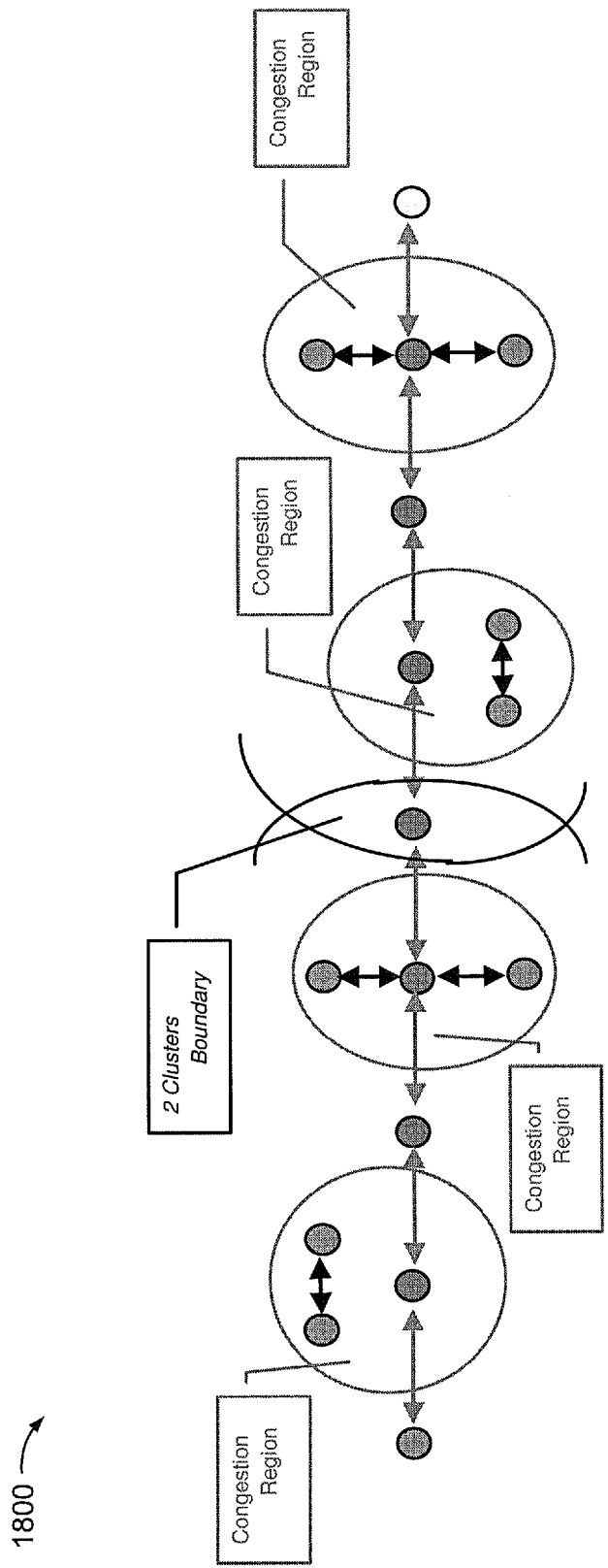
FIG. 18 is a depiction of network topology used in experiments to assess AMAC protocol support for TCP flows when operating in multi-hop wireless network.

FIG. 18 is a depiction of network topology 1800 used in the experiments to assess AMAC protocol support for TCP flows when operating in multi-hop wireless network.

The most challenging and worst case scenario to evaluate AMAC fairness for competing TCP flows uses a multi-hop network topology scenario designed to make the TCP flow under evaluation experience high incidents of hidden terminal and exposed nodes challenges. The selected topology and test scenario forces the main TCP flow to compete with other TCP flows at every other hop where the competing TCP flows have very short path between source and destination, 1 or 2 hops at most.

Figure 19:
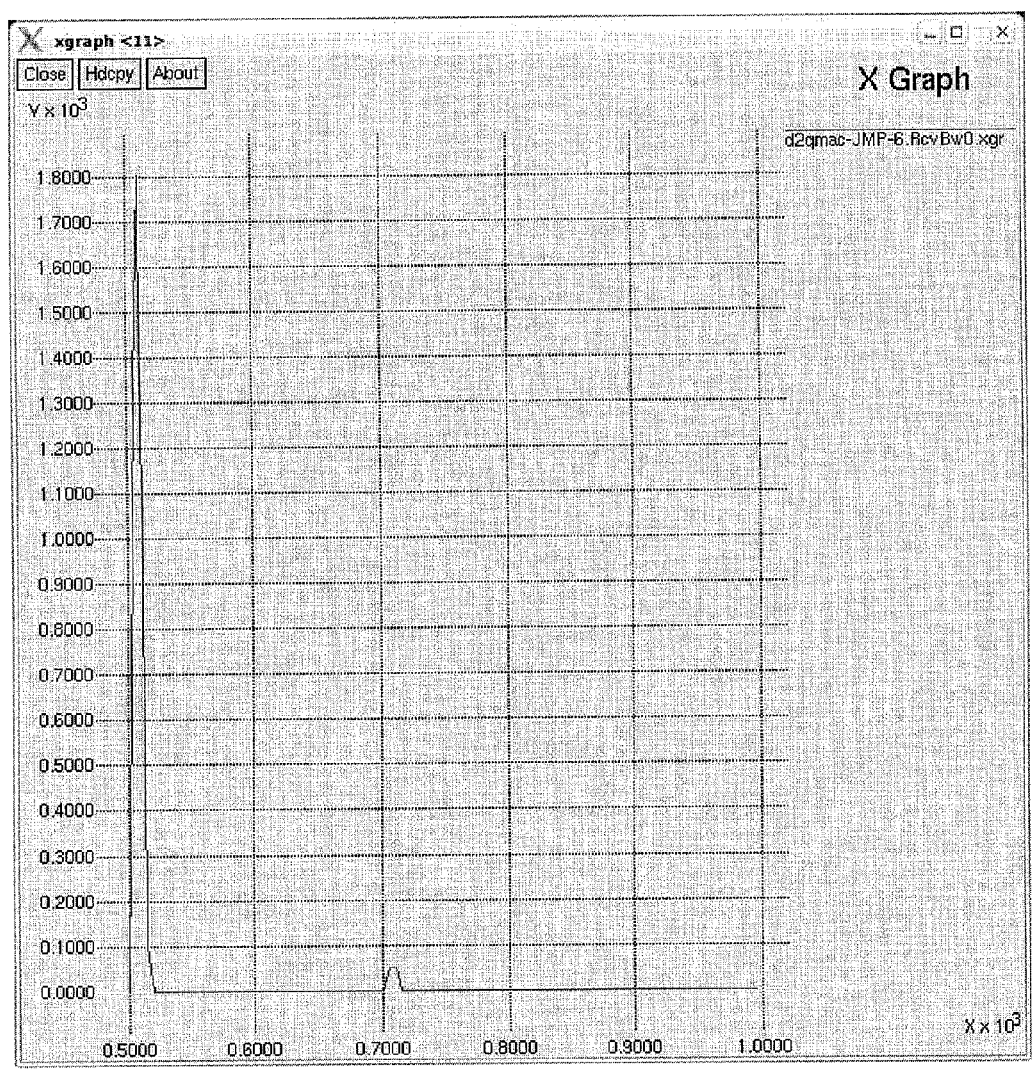
FIG. 19 is a graph of IEEE 802.11 CSMA/CA MAC 8-hops TCP flow throughput.

FIG. 19 is a graph 1900 of IEEE 802.11 CSMA/CA MAC 8-hops TCP flow throughput, to illustrate the channel capture and unfairness problems described above.

Figure 20:
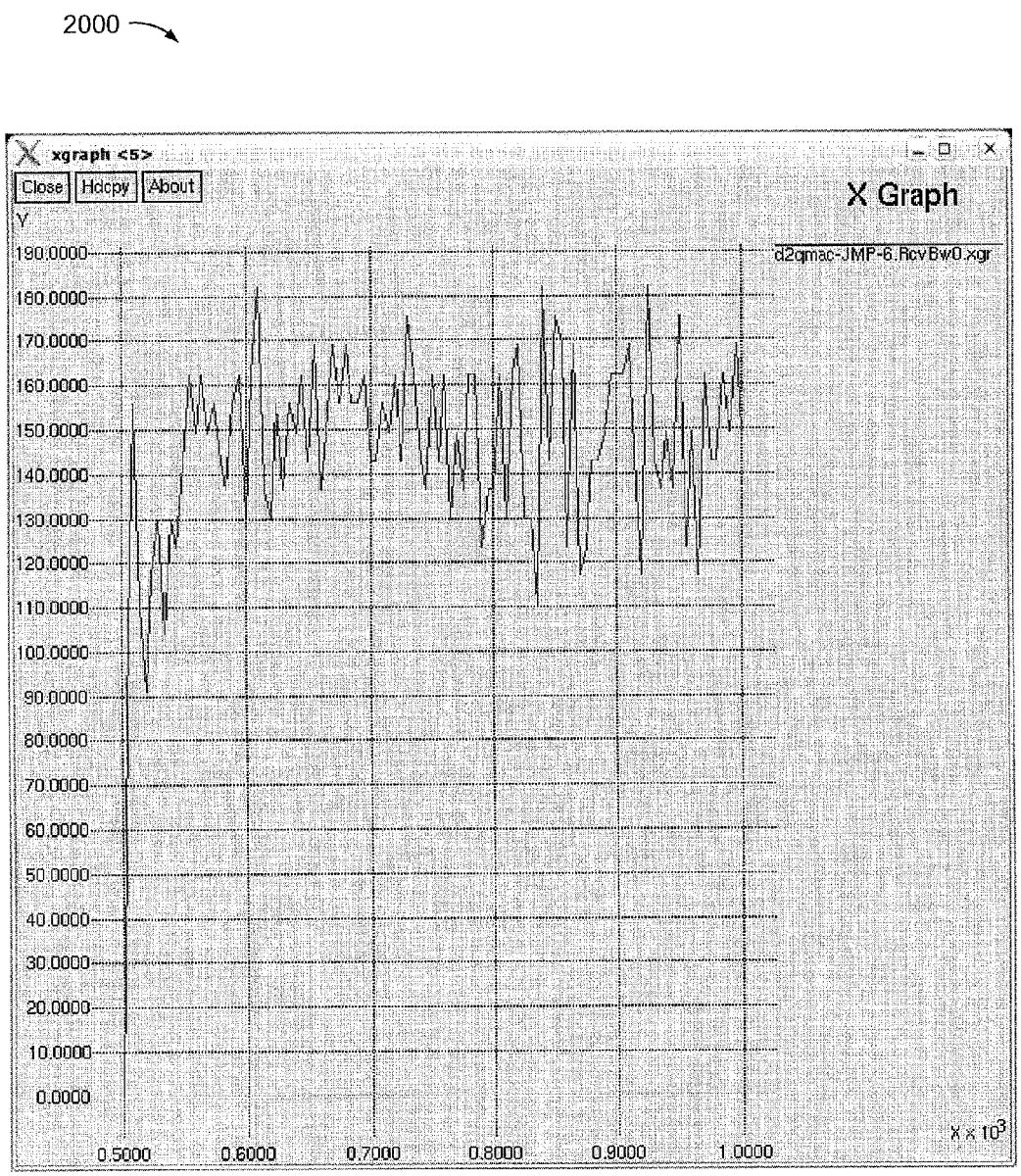
FIG. 20 is a graph of AMAC 8-hops TCP flow throughput.

FIG. 20 is a graph 2000 of AMAC 8-hops TCP flow throughput, illustrating no channel capture and fair bandwidth distribution.

Graphs 1900 and 2000 contrast AMAC and IEEE 802.11 MAC performance properties for end-to-end throughput, fairness in TCP bandwidth allocation, and channel-capture avoidance for competing TCP flows when used in identical conditions in a wireless multi-hop deployment.

Several NS2 experiments were used to simulate node movement to form a multi-hop chain as illustrated in FIG. 19. A main TCP flow was then established between the two nodes at both ends of multi-hop chain nodes forcing this flow to cross multi-hop path where each node along the path is placed 150 meter apart. A competing TCP flow is introduced at every other hop to create network congestion zones and extreme condition for experiencing the channel capture problem. All the nodes in the experiment were configured with Omni directional antenna, a 1 Mbps maximum rate for the shared RF channel, and a two-way ground propagation model for the shared RF channel. The node configuration provides a 250 meter maximum transmit/receive range. The selected node placement and configuration aims to make all intermediate nodes in the path venerable to hidden and exposed terminal problems.

In the experiments, the main TCP flow is stared after 500 s with the competing TCP flows at every other hop started at 510 s. The total number of bytes received by the destination node of the main flow was sampled every 5 seconds; and the results were graphed for the main TCP flow after the experiment ends at 1000 s.

FIGS. 19 and 20 also contrast AMAC against IEEE 802.11 CSMA/CA MAC by plotting measured throughput (goodput) performance at the receiver of the main TCP flow from the start of the TCP connection until the experiment ends. These two plots compare the performance of two MAC protocols with identical TCP configuration and network topology for a main TCP flow using an 8 Hops path, and identical settings for the competing TCP flow at every other hop where the source and destination of competing flows are both direct neighbors and neighbors of an intermediate node on the 8 hop path of the main TCP flow.

FIG. 19 show the throughput of the main TCP flow critically fails to overcome the channel capture problem. The results in FIG. 19 show that once the competing TCP flows with shorter paths are started, at 510 s, the main TCP flow fails to pass packets to the destination. This is a result of IEEE 802.11 DCF CSMA/CA unfair distribution of bandwidth due to adverse interactions between the TCP flow control and the MAC congestion avoidance methods. This adverse interaction allows the short path competing flows to capture the channel, and as result the main flow starves and fails to pass packets until all competing flows are suspended.

By contrast, AMAC results in FIG. 20 show that the throughput of the main TCP flow was not impacted when the competing TCP flows were started at 510 s, reflecting a profound improvement in fairness in bandwidth distribution and cross-layer interactions behavior with the TCP transport protocol. When AMAC is used in these experiments, each intermediate node on the 8 hop path for the main flow was assigned a dedicated short CFP that occurs at each epoch interval. These CFPs were equally spaced with a contention period between them. The IEEE 802.11 standard MAC does not support contention-free access in the ad-hoc mode, so all nodes are required to use contention access for all packet transmissions.

3.3. Characterization of Cross-Layer Interactions in Multi-Hop Wireless Ad-Hoc Networks on TCP Performance In order to characterize the performance of TCP protocol in multi-hop wireless network, experiments were conducted using the AMAC protocol NS2 model 1600 in order to better understand the potential cross-layer interactions between the various settings of AMAC methods as well as the various configurations parameters that can be set for the TCP/IP upper layers protocols and their impact performance of TCP protocol.

Potential sources of interactions that may impact overall TCP flows throughput in multi-hop wireless mobile ad-hoc networks were examined. For example, interactions with upper layer protocols such as the Address Resolution Protocol (ARP), routing protocols, were examined, and throughput performance was examined when various standard versions of TCP protocol are used. Unfortunately, exhaustive analysis and characterization of these interactions involves a very large set of settings at various levels of the protocol stack.

There is substantial number of configurable parameters that can be set for AMAC and TCP/IP upper layer protocols. Several key configuration parameters inherent to AMAC protocol were identified and considered with respect to impact performance, such as the duration of the epoch interval, and duration of CFPs assigned to intermediate forwarding nodes for multi-hop TCP flow. These values influence the amount of bandwidth dedicated to the TCP flow, and frequency of transmit opportunity allowed to each node on the path of the TCP flow.

Other AMAC parameters impacting broadcast traffic, such as forcing broadcast messages to occur only during CFP periods for nodes that have at least one dedicated CFP, may impact responsiveness of address-resolution and route-discovery protocols positively during heavy congestion periods, or may have an adverse impact during low network load periods.

Other cross-layer interactions configurations for upper layer TCP/IP protocols that may be evaluated include the type of MANET routing method used at layer 3, reactive or proactive routing, and the specific MANET routing protocol employed, which may include, for example, Ad-hoc On-demand Distance Vector (AODV), Destination-Sequenced Distance Vector (DSDV).

Other factors that may be evaluated include the size of packet used for TCP flow, the size of packets queues at each network node, the version and type of TCP protocol (e.g., TCP, Taho, Reno, new Reno), and various configuration for the maximum TCP window size. Combination of one or more of these configurations may prove to be a critical factor in performance of TCP in multi-hop network.

The substantial number of possible configurations makes it unfeasible to conduct exhaustive factorial tests for all possible combinations of all possible configurations, and analysis and study results from such an undertaking. Instead, Design of Experiments (DOE) techniques were applied to reduce the number of experiments. DOE screening-design methods identified more-critical cross-layer configuration factors influencing the throughput of TCP flows in multi-hop ad-hoc networks. The DOE screening-design experiments revealed that the top cross-layer configurations parameters with most significant impact on TCP throughout are three independent factors. They include the epoch interval duration, the average size of TCP packets, and the duration of CFPs assigned to nodes on the TCP flow multi-hop path.

Figure 21:
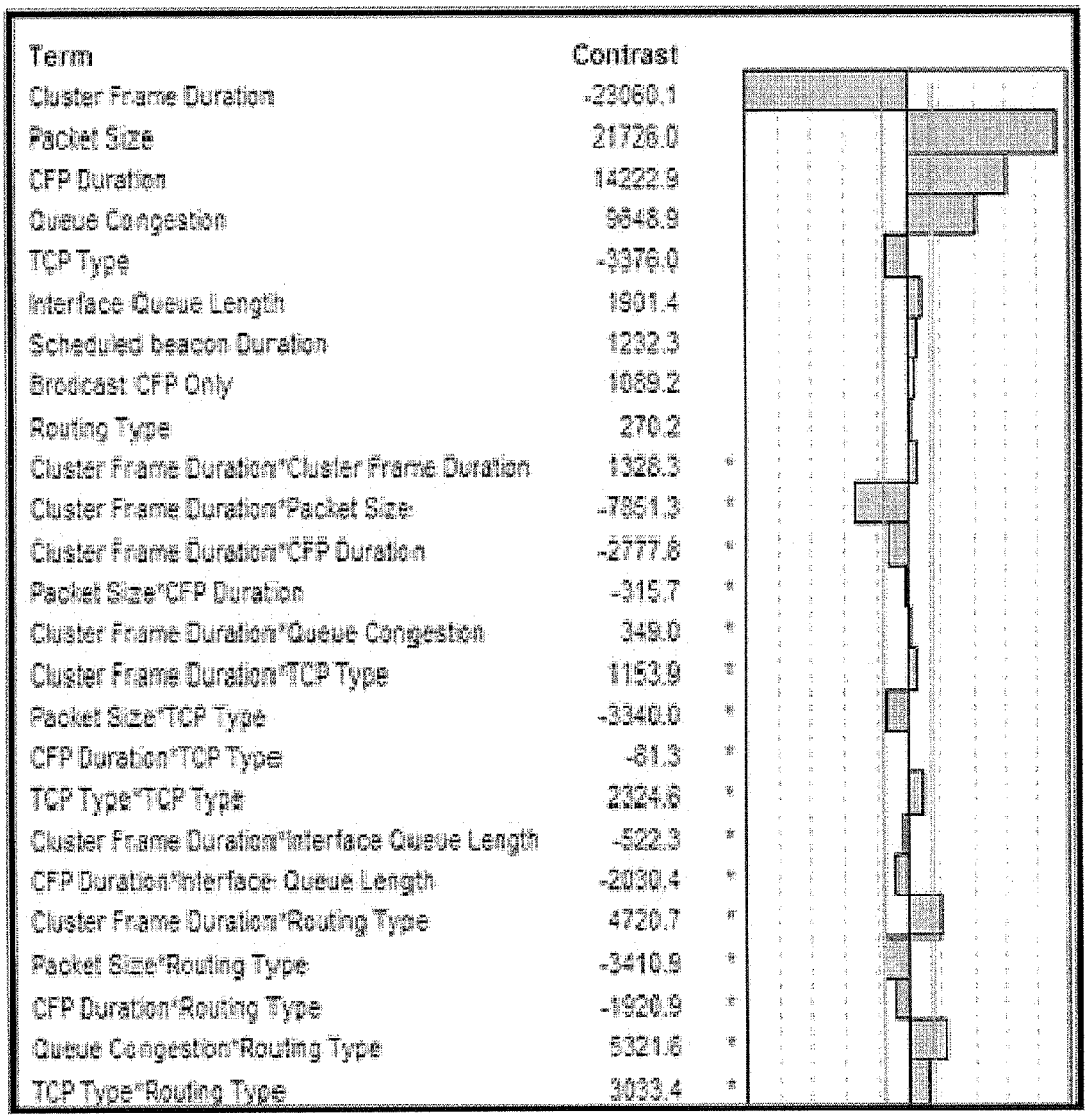
FIG. 21 is a graph of results of Design of Experiments (DOE) screening analysis employed in the evaluation of the prototype AMAC of FIG. 17.

FIG. 21 is a graph 2100 of results of Design of Experiments (DOE) screening analysis employed in the evaluation of the prototype AMAC.

The DOE screening-design experiments results show that increasing packet size and CFP duration increase TCP flow throughput across the multi-hop wireless network, independent of any other setting. The results also show that decreasing duration of epoch interval increases the TCP throughput.

These results seem logical since an increase in duration of CFPs assigned to TCP flow, and/or a decrease in epoch interval duration should increase the dedicated bandwidth assigned to multi-hop TCP flow, which should increase the throughput of this TCP flow.

The positive impact of TCP packet size can be explained by the fact that large packets incur lower header overhead-to-payload ratio. Moreover, longer packets use less RTS/CTS exchanges to transmit the same amount of payload data, relative to shorter packets. As a result, and assuming that longer packets will not experience high incidents of collisions, larger packets consume less inter-packet channel overhead in terms of time required for medium to remain idle before next transmission is allowed.

Inherent adaptive congestion avoidance capabilities of AMAC permits integration of contention and contention-free access, which provides excellent protection from collisions for packets. Standard CSMA/CA MAC approaches permit use of longer packets even in high network load conditions. A pure CSMA/CA contention access MAC will favor shorter packet sizes, particularly during high network loads, resulting in high per-packet and high inter-packet overheads.

3.4. Short CFP Impact on TCP Traffic Throughput and Spectrum Efficiency

Insight from the DOE screening-design analysis was used to evaluate the response of CFP duration, in terms of actual TCP rate, over an 8 hops path. The evaluation involved measuring the spectrum-efficiency metric of AMAC protocol in terms of the actual TCP bit rate received at a destination, relative to the reserved bit rate allocated for multi-hop TCP flow. The reserved bit rate is determined as a function of the duration of CFP allocated to each node in the multi-hop path between the source and destination nodes of the main TCP flow.

Figure 22:
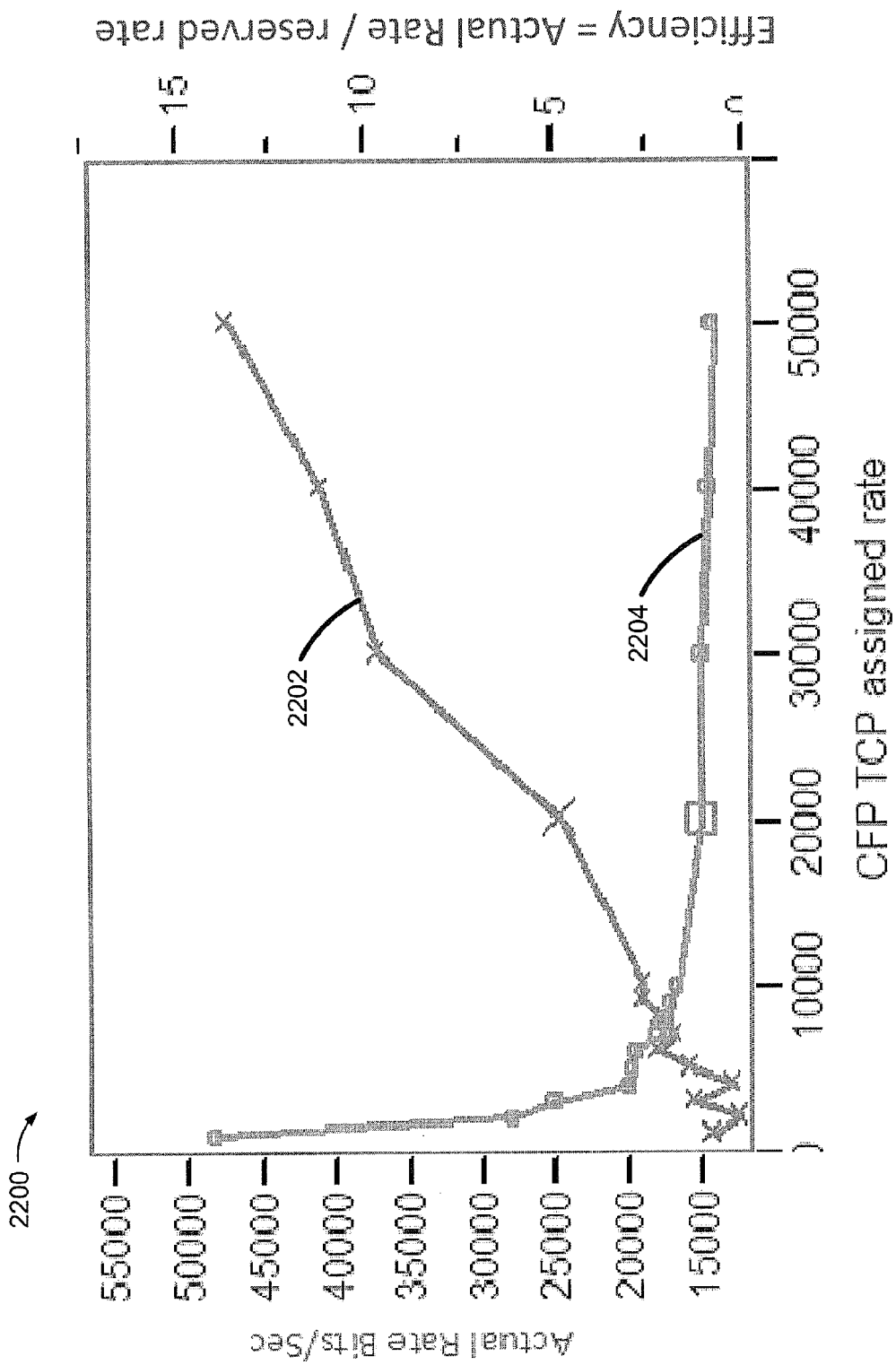
FIG. 22 is a graph of protocol spectrum efficiency and throughput metric for multi-hop TCP flow as a function of reserved bandwidth, or duration of CFPs.

FIG. 22 is a graph 2200 of protocol spectrum efficiency and throughput metric for multi-hop TCP flow as a function of reserved bandwidth, or duration of CFPs.

Graph 2200 includes an overlay plot 2202 of the TCP throughput and the spectrum efficiency measures for the main TCP flow that passes over an 8 hop path with packet size set to 2000 bytes, and 1 second epoch interval. Plot 2202 that shows TCP throughput in the left-hand axes, measured in terms of actual received bit rate (in bps) at destination as a function of CFPs durations. As such, plot 2202 shows TCP throughput in (bps) measured against the reserved or dedicated bandwidth (bps) assigned to all nodes on the path of the TCP flow.

Graph 2200 also includes a plot 2204 that reflects the reserved/allocated-bandwidth spectrum efficiency metric for the TCP flow. The data in plot 2204 came from several experiments where in which the duration of CFPs allocated to nodes in the multi-hop path of the TCP flow was varied. The actual average throughput in each measurement is computed by accumulating all bits received at the destination of the main TCP flow over the test interval. Plot 2202 for the TCP throughput increases as the dedicated bandwidth assigned to TCP, from the shared channel capacity, is increased. Plot 2204 shows the spectrum-efficiency of AMAC protocol when used to transmit TCP flows in multi-hop wireless network. Plot 2204 reveals that any minor TCP flow throughput gains attained as a result of increasing the dedicated bandwidth (i.e., CFP duration allocated to TCP flow), will be attained at significant spectrum-efficiency cost.

In fact, plot 2204 shows that very short CFPs yield the best spectrum efficiency results. This may be attributed to full integration of contention-free access (CFA) and contention-access (CA) features of AMAC, in which a node with dedicated CFPs may start CFA transmission during one of its allocated CFPs, and the node is allowed to continue and complete its packet transmission during the immediately-subsequent CP. The CFA packet transmission is protected from collisions, even from hidden nodes collision, when the node is able to transmit RTS and receive CTS during its CFP.

As such, the most efficient CFP duration setting for spectrum utilization is where CFP duration equals minimum duration required to allow completing exchange of RTS and CTS control packets. This corresponds to the minimum duration required to send RTS, wait for SIFS, and receive CTS. An unused CFP (e.g., where an allocated node does not have data to transmit at the time of CFP), having a short-duration, incurs less spectrum penalty compared to longer CFP. Moreover, when short CFPs are utilized, other nodes sharing the same channel will have opportunity to use a longer CPs to transmit any pending packets. Whereas other nodes are be precluded from sending during the full duration of long CFPs, resulting in spectrum resource waste.

Figure 23:
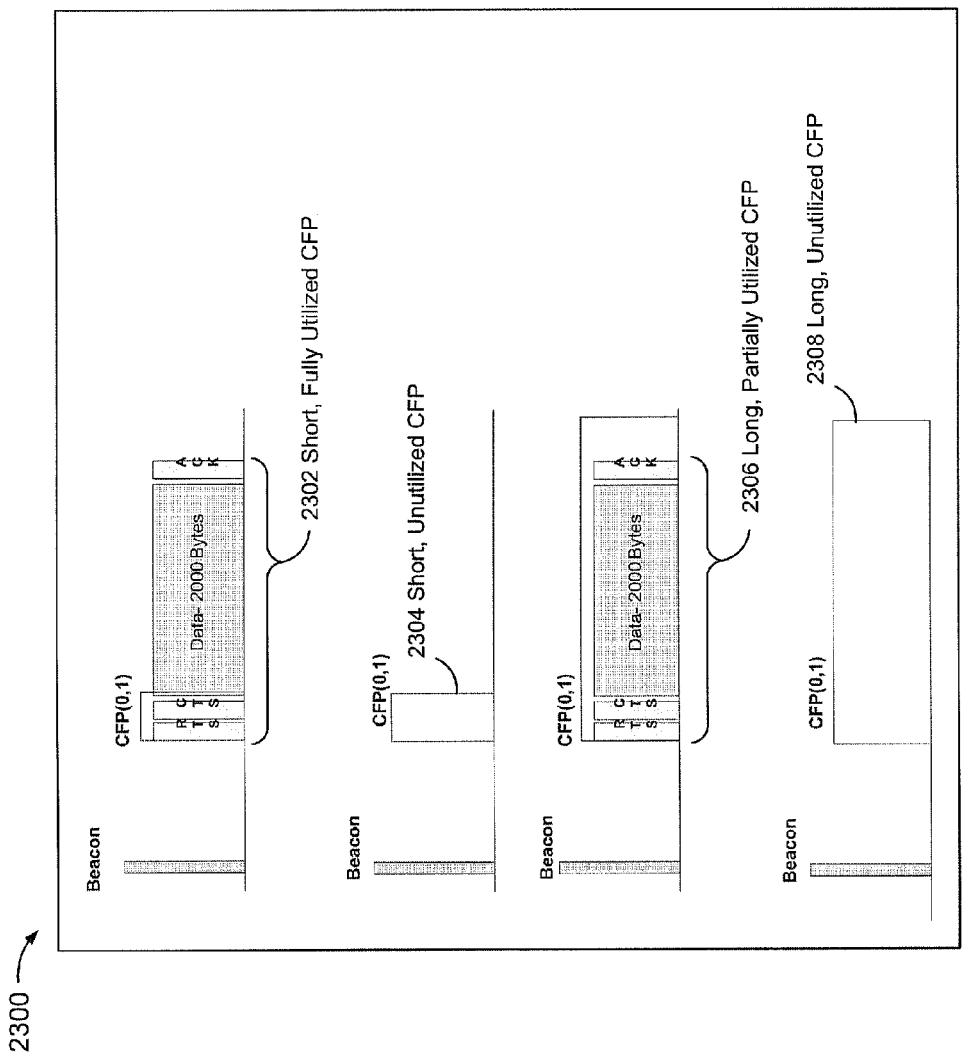
FIG. 23 is a chart to contrast spectrum efficiencies of partially and fully utilized CFPs, including a short.

FIG. 23 is a chart 2300 to contrast spectrum efficiencies of partially and fully utilized CFPs, including a short, fully utilized CFP 2302, a short, unutilized CFP 2304, a long, partially utilized CFP 2306, and a long, unutilized CFP 2308.

The DOE screening-design analysis revealed that a shorter AMAC epoch interval yields the maximum response in terms of improving TCP flow throughput in multi-hop wireless networks. This is understandable, because reducing the duration of AMAC epoch interval is another means of increasing allocated bandwidth for nodes that own CFPs. Specifically, the dedicated bandwidth for a CFP owner equals:

(CFP duration/Epoch Duration)*(channel rate).

For example, assuming that AMAC epoch interval is set to 1 second, the dedicated bit rate allocated to a node that owns a CFP may be doubled by doubling the duration of the CFP that occurs once a second, or using the same CFP duration within a half second AMAC epoch interval. Based on this observation, it is expected that a multi-hop wireless network using AMAC would show similar response in terms of absolute magnitude with respect to configuration of duration of CFP and AMAC epoch interval. However, actual DOE screening-design experiments results showed that a multi-hop wireless system AMAC is more responsive to changes in epoch interval duration than to changes in CFP duration for multi-hop TCP flow throughput. Several experiments were conducted to study and analyze this observed variance of these two approaches that can be used allocate a node with an identical fixed amount of the channel bandwidth.

TABLE 1

| No. of CFPs per Second | CFP Duration | Reserved Data Rate | Actual TCP Data Rate | Actual Data Rate/Reserved Data Rate |
|---|---|---|---|---|
| 1 | 2 ms | 2000 bps | 12584 bps | 6.29 |
| 2 | 1 ms | 2000 bps | 32104 bps | 16.01 |
| 1 | 3 ms | 3000 bps | 15456 bps | 5.15 |
| 3 | 1 ms | 3000 bps | 50192 bps | 16.73 |
| 1 | 20 ms | 20,000 bps | 24520 bps | 1.23 |
| 1 | 40 ms | 40,000 bps | 41064 bps | 1.03 |
| 1 | 50 ms | 50,000 bps | 47360 bps | 0.95 |

Table 1 shows TCP throughput and efficiency response to reserved rates allocated with single CFP and multiple CFPs per node.

Table 1 lists actual measured TCP rate per second and the spectrum-efficiency metrics as a function dedicated rate assigned to the multi-hop TCP flow and how this rate was allocated. The first two rows contrast the actual rate and spectrum-efficiency when the actual dedicated/reserved rate for TCP flow using CFP is set to approximately 2000 bps.

The first row shows experiment outcome when allocated one CFP was allocated to every node along an 8 hops TCP flow path, where the CFP had a 2 ms duration, occurring once every epoch interval of 1 second. This effectively reserved approximately 2000 bps for the main 8-hops TCP flow when the overall shared channel rate is set to 1 Mbps.

The second row shows results when two CFPs with 1 ms duration were allocated to each node along the 8 hops path of the TCP flow. This effectively reserved approximately 2000 bps for the 8-hops TCP flow when channel rate is 1 Mbps. Even though identical amounts of bandwidth are allocated to the multi-hop TCP flow, the results of the experiments show profound difference in actual TCP rate and spectrum efficiency depending on the method used to allocate the dedicated bandwidth. Assigning two CFP with 1 ms duration yields significant improvements in throughput and spectrum utilization efficiency for multi-hop TCP flow when compared with assigning a single 2 ms CFP.

Rows three and four in Table 1 show significant improvement in performance when each node along the path of the multi-hop TCP flow are assigned three 1 ms CFPs at every epoch interval when compared to assigning a single 3 ms CFP to each node for the same epoch interval duration. This different may be attributed to cross-layer interactions between MAC layer congestion avoidance mechanisms and TCP protocol response to network round-trip delay.

As explained earlier, AMAC employs an adaptive congestion avoidance mechanism to handle transient network congestion events, in which packets are allowed to be transmitted as soon as possible when the medium is deemed idle during CP, or during one of the CFP owned by the packet transmitter. A node that owns one or more CFP is allowed to retransmit a packet during a CP for a limited amount of time, and then it is forced to withhold all subsequent retransmission attempts to be conducted only during any of the node's CFPs. This congestion avoidance approach will force any AMAC node to revert from a node capable of supporting an integrated contention and Contention free access methods, to a node limited to pseudo Time-division Multiplexing (TDM) mode use during heavy network load periods. TDM systems can introduce significant additive delay when used in multi-hop network, as nodes are forced to wait for arrival of its time-slot to transmit a packet to next hop at every intermediate node in a multi-hop paths resulting in an additive end-to-end packet forwarding delay.

Assigning multiple CFPs with short duration to a node guarantees a node multiple opportunities to transmit a packet within a fixed SBTT interval; which will reduce the end-end additive delay that packets may experience if these packets are forced to be transmitted only during long CFPs that occurs once every epoch interval when any parts of the network experience significant network load.

In addition, AMAC will exhibit very short end-to-end delay when network load is low at various times and locations across the duration of the TCP session and the multi-hop paths it is forced to use.

Additionally, guaranteed transmission opportunities recurring at higher rates along the multi-hop path allow TCP acknowledgments packets to arrive at the source faster which will result in rapid increase in packet flow in the forward direction.

As such, use of short and frequently reoccurring CFPs configuration is recommended for TCP traffic; our experiments results and our observations show that this recommended configuration should result in significant increase in multi-hop TCP flow throughput; as well as significant increase in spectrum utilization efficiency as the probability of fully and partially unutilized CFPs well be reduced due to increase in TCP flow rate when round-trip-delay is limited as a byproduct of TCP protocol inherent control mechanisms. Further, as discussed earlier, shorter CFP reduces potential for wastage of reserved bandwidth when any CFP cannot be fully utilized by its owner whenever there are no sufficient data available for transmission when the CFP arrives.

3.5. AMAC Fairness and Scalability Performance for UDP Traffic

Several NS2 experiments were designed to evaluate the fairness and scalability performance for an AMAC system when large number nodes sharing a common channel transmit UDP traffic flows. In these experiments a deterministic placement of nodes to force each node in the experiments to be direct neighbor of all other nodes sharing the channel.

Figure 24:
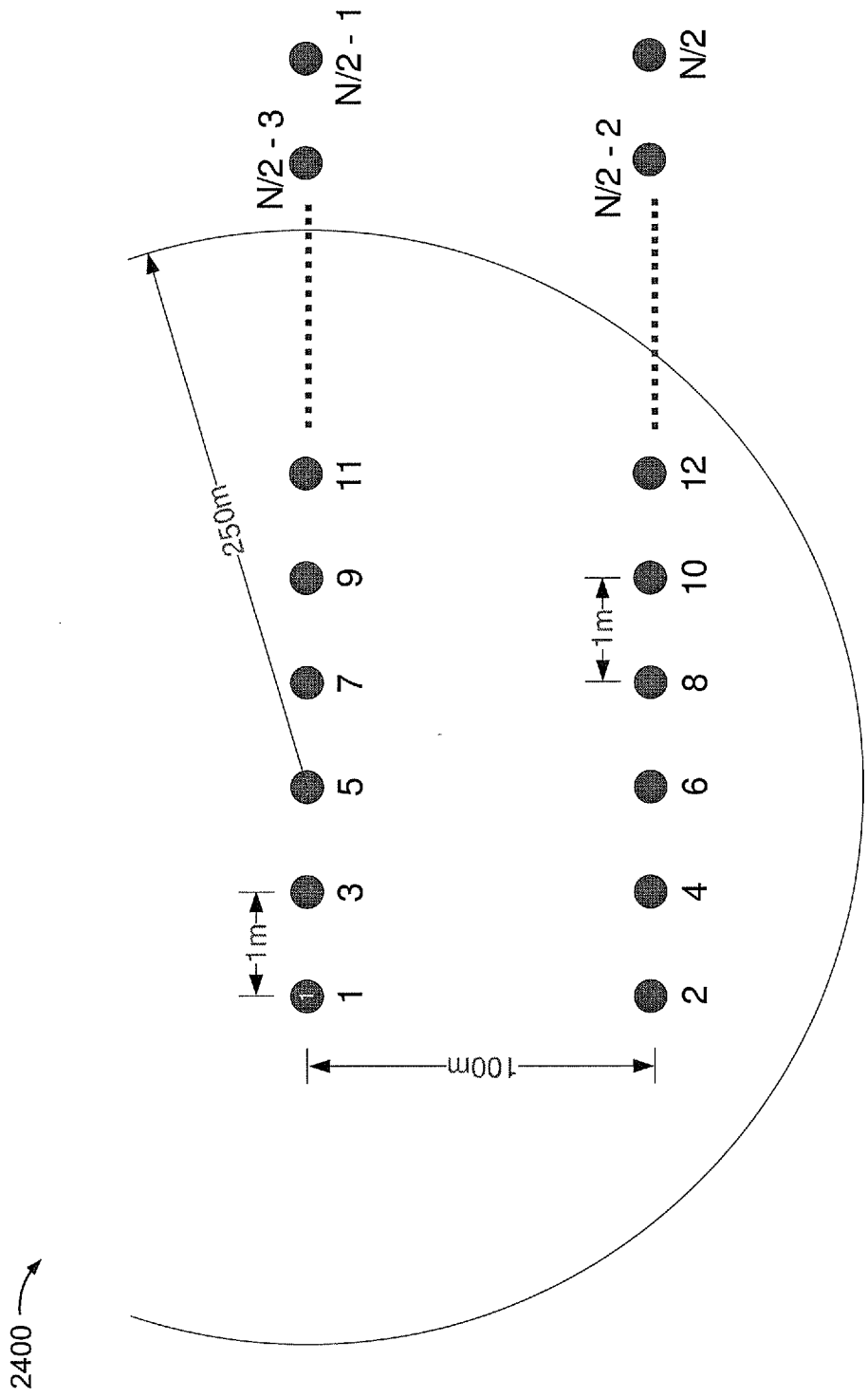
FIG. 24 is an illustration of network topology used in scalability experiments with UDP traffic.

FIG. 24 is an illustration of network topology 2400 used in scalability experiments with UDP traffic.

Network topology 2400 was used in the experiment to isolate all potential cross-layer interactions from influencing variance in scalability and fairness when used by large number of nodes to share a common RF channel. Delay jitter, fairness in distribution of channel resources attributes, as well as scalability in terms of maximum number of nodes that can be supported were examined given a fixed traffic rate generated by each node that share a common channel, the overall throughput of competing UDP flows, and variances between nodes in actual traffic throughput. In our experiment delay Jitter is computed in terms of inter-packet arrival variance.

The experiments compare AMAC performance against the standard IEEE 802.11 CSMA/CA protocol performance in DCF mode. The nodes were placed on a two parallel line segments that are 100 meters apart. Half of the N deployed nodes were positioned on each segment with 1 meter distance apart. The node's communication range is set to 250 meters. With values of N less than 500, all nodes stay in the range of each other and the potential of collisions becomes very high. This experiment setup allows validating the AMAC performance under stretch. All nodes are equipped with Omni directional antennas and a two-way ground propagation model was used for RF channel with a channel rate of 1 Mbps. The epoch interval for AMAC was set to 3 sec. Full duplex UDP sessions were established between the pair of corresponding nodes on the two line segments, i.e. node i communicates with node N/2+i. Traffic was generated by each node at a constant 90K bit/sec with packet size set to 2000 Bytes.

In each scalability experiment, the number of nodes has been varied. Each node is assigned a CFP with 1 ms duration. The reported results are on individual simulation runs, each lasting for 1500 sec. The IEEE 802.11 CSMA/CA DCF mode is used as baseline for comparison.

Figure 25:
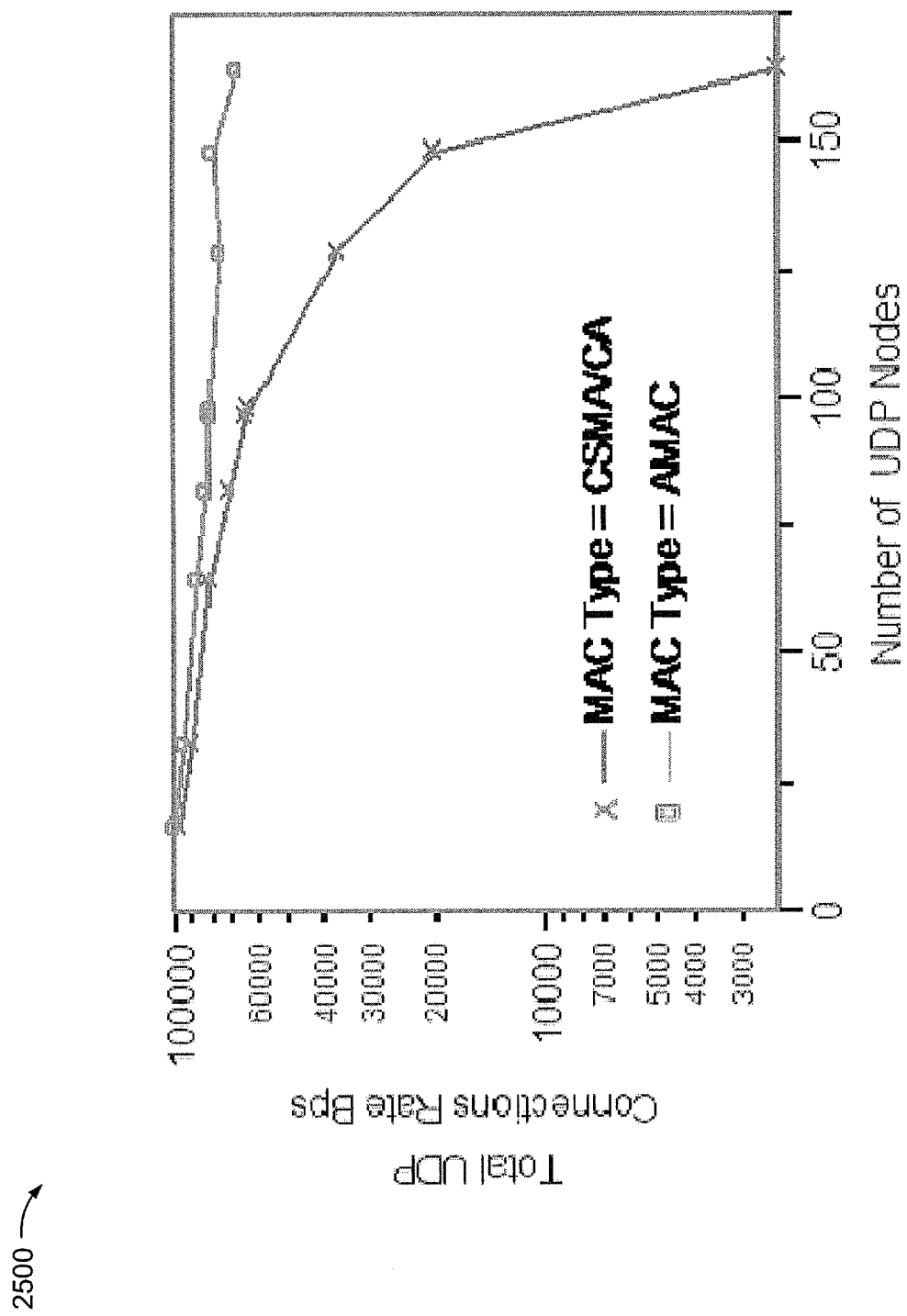
FIG. 25 is graph of AMAC scalability performance relative to an IEEE 802.11 CSMA/CA standard.

FIG. 25 is graph 2500 of AMAC scalability performance relative to an IEEE 802.11 CSMA/CA standard.

FIG. 25 shows the effective channel capacity that AMAC could achieve in comparison to the IEEE 802.11. The vertical axes show the total UDP connections rate in Bytes per second, and the horizontal axes show the number of nodes competing for the shared channel resources. For small networks, the performance advantage is not huge. However, when the number of nodes increases, collisions become excessive and the 802.11 CSMA/CA DCF MAC basically becomes dysfunctional. Meanwhile, AMAC's performance scales well for large networks, sustaining its resource efficiency and achieving an effective capacity of about 80 KBps. While we don't conduct experiments comparing AMAC against pure TDMA MAC system, from our previous TCP experiment analysis and the results for bursty traffic experiments that we cover in the following section, it is clear that full integration of CSMA/CA and TDMA access capability, with ability to support short CFPs duration, allows AMAC to offer significant throughput and scalability improvement over pure TDM systems also, where total number of nodes in TDMA can't exceed available number of fixed width timeslots, and where competing nodes in pure TDMA MAC will not be able to reduce bandwidth wastage as a result of fully and partially unutilized timeslots that are reserved for specific nodes.

3.6. AMAC Spectrum Efficiency for Bursty Traffic

Several experiments were performed in order to evaluate the AMAC protocol performance and its cross-layer interactions when used in multi-hop wireless deployments to support best effort bursty traffic that needs to cross multi-hop path with high incidents of congestions, hidden node and exposed node incidents. In these experiments, the AMAC NS2 simulation model allowed us to track throughput and spectrum efficiency metrics when traffic arrival rate, packet sizes, and traffic burst size were not static.

Figure 26:
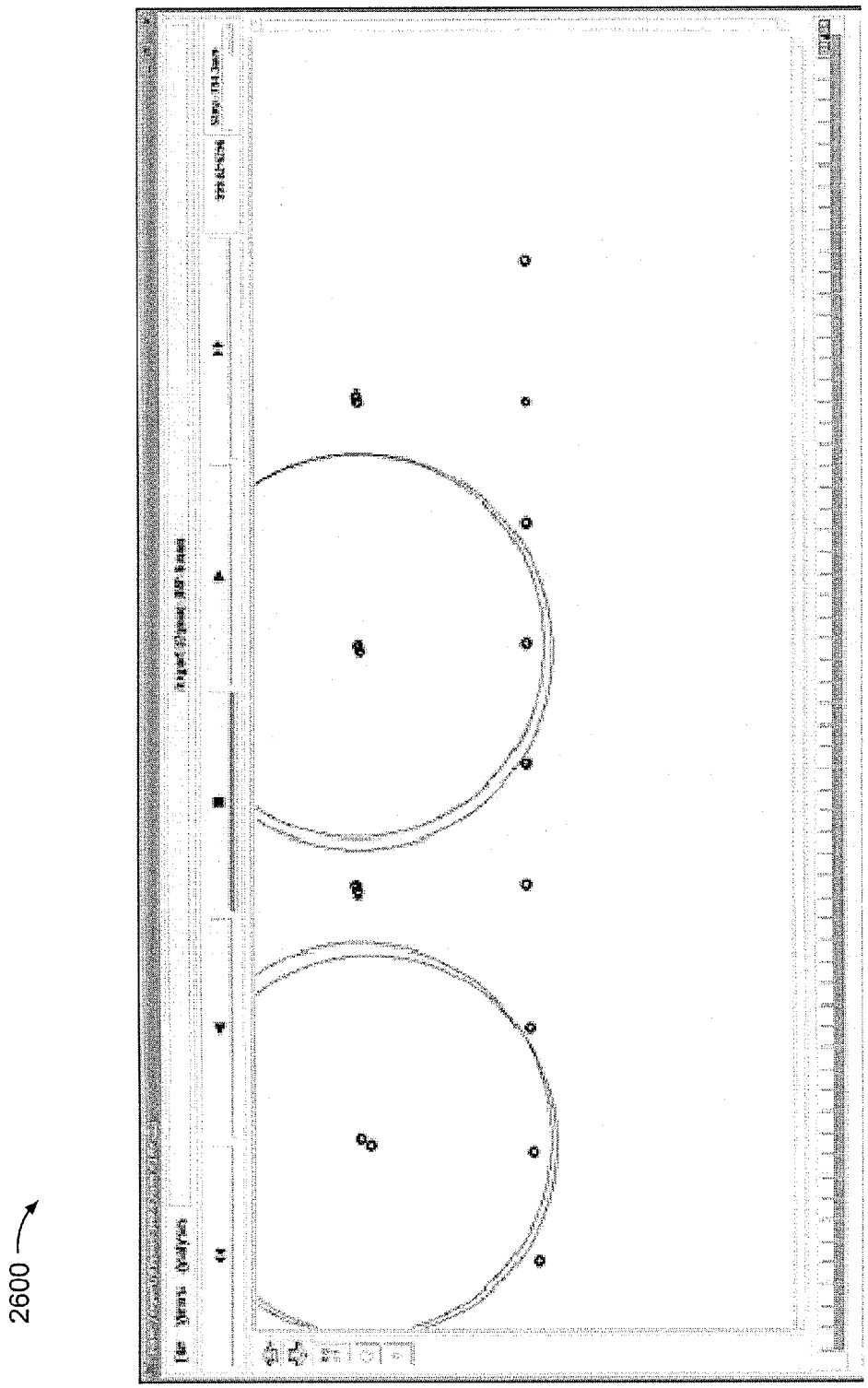
FIG. 26 is a screen capture of showing network topology used for bursty traffic experiments.

FIG. 26 is a screen capture of Nam output showing network topology used for bursty traffic experiments.

An experiment was designed where a multi-hop UDP flow connected to a data source with a random exponential inter-packet arrival times, and where packet sizes changes every 5 seconds using a uniform random distribution value ranging between 1000 and 2000 octets. The UDP data source peak rate was set to 80 kbps with 80% on and 20% off average traffic burst distribution.

The UDP flow is established between two nodes that are 8-hops apart, and we placed at every other hop a pair of adjacent nodes at 120 meters from the closet intermediate node in the multi-hop path. These adjacent nodes are used to compete for the channel with the main UDP flow; these competing nodes were used to setup a single hop TCP session to create a heavy congestion zone at every other hop along the multi-hop path used by our main UDP flow. The distance between all nodes in the 8 hops path of the main UDP flow is 150 meters; this distance is selected to increase probabilities of hidden and exposed nodes conditions at all intermediate nodes in the UDP multi-hop path. FIG. 26 shows a screen capture of NS2 NAM graphical tool depicting the network topology used in our spectrum efficiency experiments for bursty UDP traffic. In our experiments, all nodes are equipped with Omni directional antennas and a two-way ground propagation model was used for RF channel with a channel rate of 1 Mbps. The epoch interval for AMAC is set to 1 sec.

Figure 27:
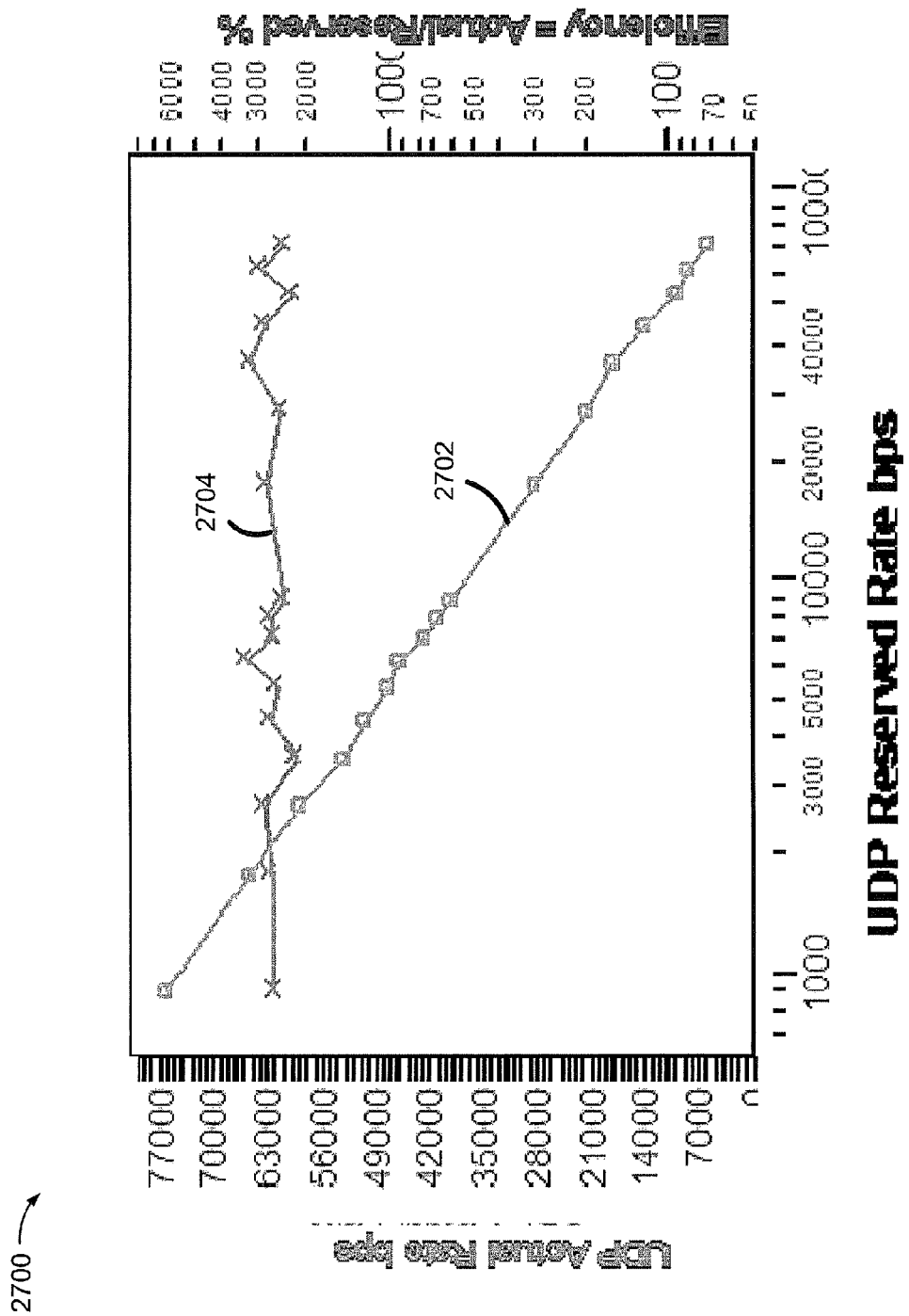
FIG. 27 is an overlay plot of AMAC actual bit rate and spectrum efficiency as a function of dedicated spectrum for UDP flow configured in multi-hop path and burtsy traffic source.

FIG. 27 is an overlay plot 2700 of AMAC actual bit rate and spectrum efficiency as a function of dedicated spectrum for UDP flow configured in multi-hop path and burtsy traffic source.

In these experiments, NS2 scripts were designed and used to move nodes to form the experiment topology, and to allocate CFP to each nodes along the multi-hop path of the UDP flow, to control traffic start times and to set duration for epoch and associated CFPS. Using these NS2 experiment scripts, the main multi-hop UDP session started after 500 seconds and the competing TCP flows after 510 seconds. The flows were allowed to generate packets until the 1000 seconds experiment duration elapse. The average bit rate at the destination of the multi-hop UDP flow was computed, and then spectrum efficiency was measured by dividing the actual bit rate received at the destination by the dedicated bit rate of the CFP allocated for each node in the 8-hop path.

A curve 2702 reveals that use of shortest CFP duration yields best spectrum efficiency performance for applications with bursty best effort traffic. In addition, a curve 2704 shows also that assigning more bandwidth when traffic is bursty does not yield higher throughput. In fact, the throughput remains constant as we increase the dedicated bandwidth for the main UDP flow. We believe that the main UDP session was not able to leverage the additional capacity that were made available, as we increased the duration of the CFP assigned to each node in the multi-hop path, due to inability to leverage dedicated bit rate when UDP packets are short or not ready due to dynamic inter-packet arrival rate, infeasibility to rely on contention periods when competing with TCP with short path that will capture the channel during CP. These results show the difficulty in assigning proper amount of bandwidth when multi-hop network is established using any TDM based MAC and where nodes are expected to generate bursty traffic with unpredictable inter-packets arrival times, and variable packet sizes. Assigning the maximum expected bit rate will result in very poor utilization of spectrum. Use of AMAC technology with short CFP duration configuration provides significant improvements over pure TDMA when these bursty traffic need to be supported in multi-hop wireless deployments. This shows that AMAC technology offers significant flexibility over TDMA based MAC systems.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A method of adaptively avoiding collisions in an ad hoc wireless network, comprising:
synchronizing periodic epochs of time and a state of a schedule with other nodes of the network, wherein the schedule includes alternating contention periods and contention free periods within the epochs, and wherein each contention free period is allocated to one of the nodes;
initiating a transmission during a contention free period allocated to the node and completing the transmission during an immediately-subsequent contention period;
measuring busy times of contention periods and aggregating the measured busy times over durations of corresponding epochs;
maintaining an aggregate channel congestion factor, over the duration of the corresponding epochs, as a function of an elapsed time of the epoch and a corresponding aggregate of the measured busy times of contention periods within the epoch;
precluding broadcasting of a packet from the node during a contention period when the channel congestion factor is above a configurable congestion factor threshold;
maintaining a count of a number of times a unicast packet is re-transmitted from the node; and
precluding re-transmission of the unicast packet from the node during a contention period when the count reaches a first count threshold.

2. The method of claim 1, wherein the contention periods are at least equal to a sum of,
a maximum size packet permitted by a physical layer,
a deferral period;
a maximum random access back-off period,
a time to exchange request-to-send and clear-to-send control frames, and
a time to receive an acknowledgement control frame.

3. The method of claim 1, wherein the contention free periods includes a contention free period at least equal to a sum of,
a deferral period,
a time to exchange request-to-send and clear-to-send control frames, and
time to transmit at least a portion of a corresponding data packet.

4. The method of claim 1, wherein the contention free periods include a short-duration contention free period approximately equal to a sum of,
a deferral period, and
a time to exchange request-to-send and clear-to-send control frames.

5. The method of claim 4, further including;
reserving one of the short-duration contention free periods in each of multiple successive epochs to support a variable bit rate application of the node; and
reserving multiple ones of the short-duration contention free periods in each of multiple successive epochs to support a constant bit rate application of the node.

6. The method of claim 1, wherein the contention free periods include contention free periods of various durations.

7. The method of claim 1, further including:
precluding re-transmission of the unicast packet from the node during a contention free period allocated to the node when the count reaches a second count threshold.

8. The method of claim 1, wherein the precluding of the re-transmission of the unicast packet includes:
selectively operating the node in one of a static mode and a responsive mode,
applying a fixed value to the first count threshold when the node is in the static mode; and
selectively applying one of multiple values to the first count threshold when the node is in the responsive mode based a value of the channel congestion factor.

9. The method of claim 1, wherein the maintaining of the aggregate channel congestion factor includes, for each epoch, maintaining a ratio of,
TotalCSMACABusyDuration/TotalCSMACADuration, and wherein,
TotalCSMACADuration is the elapsed time of the epoch,
TotalCSMACABusyDuration=(TotalCSMACABusyDuration)+(CPi_BusyDuration),
CPi_BusyDuration is the measured busy time of a most recent contention period as of the elapsed time of the epoch, and
TotalCSMACABusyDuration is the aggregate busy time of preceding contention periods of the epoch.

10. A non-transitory computer readable medium comprising computer program logic stored thereon, the computer program logic comprising instructions that, when executed by a processor, cause the processor to:
synchronize periodic epochs of time and a state of a schedule amongst the nodes, wherein the schedule includes alternating contention periods and contention free periods within the epochs, and wherein each contention free period is allocated to one of the nodes;
initiate a transmission during a contention free period allocated to the node, and complete the transmission during an immediately-subsequent contention period;
measure busy times of contention periods, and aggregate the measured busy times over durations of corresponding epochs;
maintain an aggregate channel congestion factor, over the duration of the corresponding epochs, as a function of an elapsed time of the epoch and a corresponding aggregate of the measured busy times of contention periods within the epoch;
preclude broadcasting of a packet from the node during a contention period when the channel congestion factor is above a configurable congestion factor threshold;
maintain a count of a number of times a unicast packet is re-transmitted from the node; and
preclude re-transmission of the unicast packet from the node during a contention period when the count reaches a first count threshold.

11. The non-transitory computer readable medium of claim 10, wherein the instructions that cause the processor to synchronize include instructions to cause the processor to synchronize with respect to contention periods that are at least equal to a sum of,
a maximum size packet permitted by a physical layer,
a deferral period;
a maximum random access back-off period,
a time to exchange request-to-send and clear-to-send control frames, and
a time to receive an acknowledgement control frame.

12. The non-transitory computer readable medium of claim 10, wherein the instructions that cause the processor to synchronize include instructions to cause the processor to synchronize with respect to contention free periods that are at least equal to a sum of,
a deferral period,
a time to exchange request-to-send and clear-to-send control frames, and
time to transmit at least a portion of a corresponding data packet.

13. The non-transitory computer readable medium of claim 10, wherein the instructions that cause the processor to synchronize include instructions to cause the processor to synchronize with respect to a short-duration contention free period that is approximately equal to a sum of,
- a deferral period, and
- a time to exchange request-to-send and clear-to-send control frames.

14. The non-transitory computer readable medium of claim 13, wherein the instructions that cause the processor to synchronize, further include instructions to cause the processor to:
- reserve one of the short-duration contention free periods in each of multiple successive epochs to support a variable bit rate application of the node; and
- reserve multiple ones of the short-duration contention free periods in each of multiple successive epochs to support a constant bit rate application of the node.

15. The non-transitory computer readable medium of claim 10, further including instructions to cause the processor to:
- preclude re-transmission of the unicast packet from the node during a contention free period allocated to the node when the count reaches a second count threshold.

16. The non-transitory computer readable medium of claim 10, wherein the instructions that cause the processor to preclude re-transmission of the unicast packet include instructions to cause the processor to:
- selectively operate the node in one of a static mode and a responsive mode,
- apply a fixed value to the first count threshold when the node is in the static mode; and
- selectively apply one of multiple values to the first count threshold when the node is in the responsive mode based a value of the channel congestion factor.

17. An adaptive medium access control (AMAC) system to adaptively access a shared wireless channel of an ad hoc wireless network on behalf of a node of the network, comprising:
- a synchronizer to synchronize periodic epochs of time and a state of a schedule amongst the nodes, wherein the schedule includes alternating contention periods and contention free periods within the epochs, and wherein each contention free period is allocated to one of the nodes;
- a transmit control system to initiate a transmission during a contention free period allocated to the node, and complete the transmission during an immediately-subsequent contention period;
- a measurement system to measure busy times of the contention periods, and aggregate the measured busy times over durations of corresponding epochs;
- a congestion monitor to measure busy times of the contention periods, aggregate the measured busy times over durations of corresponding epochs, and maintain an aggregate channel congestion factor over the duration of the corresponding epochs as a function of an elapsed time of the epoch and a corresponding aggregate of the measured busy times of contention periods within the epoch;
- a broadcast control system to preclude broadcasting of a packet from the node during a contention period when the channel congestion factor is above a configurable congestion factor threshold;
- a counter to maintain a count of a number of times a unicast packet is re-transmitted from the node; and
- a unicast control system to preclude re-transmission of the unicast packet from the node during a contention period when the count reaches a first count threshold.

18. The system of claim 17, wherein the synchronizer is implemented to synchronize with respect to contention periods that are at least equal to a sum of,
- a maximum size packet permitted by a physical layer,
- a deferral period;
- a maximum random access back-off period,
- a time to exchange request-to-send and clear-to-send control frames, and
- a time to receive an acknowledgement control frame.

19. The system of claim 17, wherein the synchronizer is implemented to synchronize with respect to contention free periods that are at least equal to a sum of,
- a deferral period,
- a time to exchange request-to-send and clear-to-send control frames, and
- time to transmit at least a portion of a corresponding data packet.

20. The system of claim 17, wherein the synchronizer is implemented to synchronize with respect to a short-duration contention free period that is approximately equal to a sum of,
- a deferral period, and
- a time to exchange request-to-send and clear-to-send control frames.

21. The system of claim 20, wherein the synchronizer is further implemented to,
- reserve one of the short-duration contention free periods in each of multiple successive epochs to support a variable bit rate application of the node; and
- reserve multiple ones of the short-duration contention free periods in each of multiple successive epochs to support a constant bit rate application of the node.

22. The system of claim 17, wherein the unicast control system is implemented to preclude re-transmission of the unicast packet from the node during a contention free period allocated to the node when the count reaches a second count threshold.

23. The system of claim 17, wherein the unicast control system is implemented to,
- selectively operate in one of a static mode and a responsive mode,
- apply a fixed value to the first count threshold when in the static mode; and
- selectively apply one of multiple values to the first count threshold when in the responsive mode based a value of the channel congestion factor.

* * * * *